United States Patent
Lutnick et al.

(10) Patent No.: US 8,117,109 B2
(45) Date of Patent: Feb. 14, 2012

(54) SYSTEMS AND METHODS FOR ESTABLISHING FIRST ON THE FOLLOW TRADING PRIORITY IN ELECTRONIC TRADING SYSTEMS

(75) Inventors: Howard W. Lutnick, New York, NY (US); Joseph C. Noviello, Summit, NJ (US); Michael Sweeting, Farnham (GB)

(73) Assignee: BGC Partners, Inc., New York, NY (US)

( * ) Notice: Subject to any disclaimer, the term of this patent is extended or adjusted under 35 U.S.C. 154(b) by 0 days.

(21) Appl. No.: 11/621,546

(22) Filed: Jan. 9, 2007

(65) Prior Publication Data
US 2007/0244795 A1 Oct. 18, 2007

Related U.S. Application Data

(63) Continuation-in-part of application No. 11/328,814, filed on Jan. 9, 2006.

(51) Int. Cl.
*G06Q 40/00* (2006.01)
(52) U.S. Cl. ........................................................ 705/37
(58) Field of Classification Search .................... 705/37
See application file for complete search history.

(56) References Cited

U.S. PATENT DOCUMENTS

| | | | |
|---|---|---|---|
| 2,134,118 A | 10/1938 | Foss | |
| 3,249,919 A | 5/1966 | Scantlin | |
| 3,541,526 A | 11/1970 | Levy et al. | |
| 3,573,747 A | 4/1971 | Adams et al. | |
| 3,581,072 A | 5/1971 | Nymeyer | |
| 3,656,148 A | 4/1972 | Belcher et al. | |
| D225,858 S | 1/1973 | Kline | |
| 3,976,840 A | 8/1976 | Cleveland et al. | |
| 4,141,001 A | 2/1979 | Suzuki et al. | |
| 4,412,287 A | 10/1983 | Braddock, III | |
| 4,551,717 A | 11/1985 | Dreher | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |
| 4,903,201 A | 2/1990 | Wagner | |
| 4,906,117 A | 3/1990 | Birdwell | |
| D308,693 S | 6/1990 | Sakaguchi et al. | |

(Continued)

FOREIGN PATENT DOCUMENTS

DE 19606467 8/1997

(Continued)

OTHER PUBLICATIONS

Notification of Transmittal of the International Search Report and the Written Opinion of the International Searching Authority or the Declaration, for International Application No. PCT/US07/60295, Feb. 15, 2008 (11 pages).

(Continued)

*Primary Examiner* — Charles R Kyle
*Assistant Examiner* — David L Wood

(57) ABSTRACT

A trading system transitions from a first state to a second state and may award a participant, when one or more criteria and/or a status of trading rights are met, with trading priority in the second state to trade on an incoming contra order. The participant may also have an associated order modified as a result of an incoming contra order and/or be caused to automatically trade on an incoming contra order.

57 Claims, 11 Drawing Sheets

U.S. PATENT DOCUMENTS

| | | |
|---|---|---|
| 4,951,196 A | 8/1990 | Jackson |
| 4,980,826 A | 12/1990 | Wagner |
| 5,038,284 A | 8/1991 | Kramer |
| 5,077,665 A | 12/1991 | Silverman et al. |
| 5,101,353 A | 3/1992 | Lupien et al. |
| D327,057 S | 6/1992 | Gosch |
| 5,136,501 A | 8/1992 | Silverman et al. |
| 5,150,118 A | 9/1992 | Finkle et al. |
| 5,168,446 A | 12/1992 | Wiseman |
| 5,181,809 A | 1/1993 | Martin |
| 5,193,924 A | 3/1993 | Larson |
| D335,660 S | 5/1993 | Busch |
| 5,243,331 A | 9/1993 | McCausland et al. |
| 5,253,940 A | 10/1993 | Abecassis |
| 5,258,908 A | 11/1993 | Hartheimer et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,339,392 A | 8/1994 | Risberg et al. |
| 5,347,452 A | 9/1994 | Bay, Jr. |
| 5,361,199 A | 11/1994 | Shoquist et al. |
| 5,367,298 A | 11/1994 | Axthelm |
| 5,373,055 A | 12/1994 | Ohmae et al. |
| 5,375,055 A | 12/1994 | Togher et al. |
| 5,463,547 A | 10/1995 | Markowitz et al. |
| 5,579,002 A | 11/1996 | Iggulden et al. |
| 5,640,569 A | 6/1997 | Miller et al. |
| 5,667,319 A | 9/1997 | Satloff |
| 5,668,358 A | 9/1997 | Wolf et al. |
| 5,689,652 A | 11/1997 | Lupien et al. |
| 5,710,889 A | 1/1998 | Clark et al. |
| 5,715,402 A | 2/1998 | Popolo |
| 5,717,989 A | 2/1998 | Tozzoli et al. |
| 5,727,165 A | 3/1998 | Ordish et al. |
| 5,757,292 A | 5/1998 | Amro et al. |
| 5,774,880 A | 6/1998 | Ginsberg |
| 5,787,402 A | 7/1998 | Potter et al. |
| 5,794,219 A | 8/1998 | Brown |
| 5,802,497 A | 9/1998 | Manasse |
| 5,826,244 A | 10/1998 | Huberman |
| 5,832,462 A | 11/1998 | Midorikawa et al. |
| 5,835,896 A | 11/1998 | Fisher et al. |
| 5,842,178 A | 11/1998 | Giovannoli |
| 5,845,261 A | 12/1998 | McAbian |
| 5,845,266 A | 12/1998 | Lupien |
| 5,873,071 A | 2/1999 | Ferstenberg et al. |
| 5,878,139 A | 3/1999 | Rosen |
| 5,890,138 A | 3/1999 | Godin et al. |
| 5,905,974 A | 5/1999 | Fraser et al. |
| 5,905,975 A | 5/1999 | Ausubel |
| 5,914,715 A | 6/1999 | Sasaki |
| 5,915,209 A | 6/1999 | Lawrence |
| 5,924,082 A | 7/1999 | Silverman et al. |
| 5,926,801 A | 7/1999 | Matsubara et al. |
| 5,950,176 A | 9/1999 | Keiser et al. |
| 5,963,923 A | 10/1999 | Garber |
| 5,987,419 A | 11/1999 | Hachino et al. |
| 6,014,627 A | 1/2000 | Togher et al. |
| 6,016,483 A | 1/2000 | Richard et al. |
| 6,029,146 A | 2/2000 | Hawkins et al. |
| 6,098,051 A | 8/2000 | Lupien et al. |
| 6,134,535 A | 10/2000 | Belzberg |
| 6,141,653 A | 10/2000 | Conklin et al. |
| 6,151,588 A | 11/2000 | Tozzoli et al. |
| 6,195,647 B1 | 2/2001 | Martyn et al. |
| 6,199,050 B1 | 3/2001 | Alaia et al. |
| 6,211,880 B1 | 4/2001 | Impink, Jr. |
| 6,230,146 B1 | 5/2001 | Alaia et al. |
| 6,230,147 B1 | 5/2001 | Alaia et al. |
| 6,247,000 B1 | 6/2001 | Hawkins et al. |
| 6,259,044 B1 | 7/2001 | Paratore et al. |
| 6,263,321 B1 | 7/2001 | Daughtery, III |
| 6,272,474 B1 | 8/2001 | Garcia |
| 6,278,982 B1 | 8/2001 | Korhammer et al. |
| 6,282,521 B1 | 8/2001 | Howorka |
| 6,311,178 B1 | 10/2001 | Bi et al. |
| 6,317,727 B1 | 11/2001 | May |
| 6,317,728 B1 | 11/2001 | Kane |
| 6,343,278 B1 | 1/2002 | Jain et al. |
| 6,363,365 B1 | 3/2002 | Kou |
| 6,405,180 B2 | 6/2002 | Tilfors et al. |
| 6,421,653 B1 | 7/2002 | May |
| 6,434,536 B1 | 8/2002 | Geiger |
| 6,438,575 B1 | 8/2002 | Khan et al. |
| 6,477,513 B1 | 11/2002 | Walker et al. |
| 6,505,174 B1 | 1/2003 | Keiser et al. |
| 6,519,574 B1 | 2/2003 | Wilton et al. |
| 6,560,580 B1 | 5/2003 | Fraser et al. |
| 6,625,583 B1 | 9/2003 | Silverman et al. |
| 6,629,082 B1 | 9/2003 | Hambrecht et al. |
| D491,944 S | 6/2004 | Lutnick et al. |
| 6,772,132 B1 | 8/2004 | Kemp, II et al. |
| D496,663 S | 9/2004 | Lutnick et al. |
| D497,912 S | 11/2004 | Lutnick et al. |
| D498,476 S | 11/2004 | Lutnick et al. |
| 6,850,907 B2 | 2/2005 | Lutnick et al. |
| D502,467 S | 3/2005 | Lutnick et al. |
| D503,712 S | 4/2005 | Lutnick et al. |
| D503,713 S | 4/2005 | Lutnick et al. |
| D503,935 S | 4/2005 | Lutnick et al. |
| D504,131 S | 4/2005 | Lutnick et al. |
| 6,903,662 B2 | 6/2005 | Rix et al. |
| 6,912,126 B2 | 6/2005 | Rudd et al. |
| 6,963,856 B2 | 11/2005 | Lutnick et al. |
| 6,965,511 B2 | 11/2005 | Rudd et al. |
| D516,072 S | 2/2006 | Lutnick et al. |
| 7,000,181 B2 | 2/2006 | Press |
| 7,003,488 B2 | 2/2006 | Dunne et al. |
| 7,076,461 B2 | 7/2006 | Balabon |
| 7,080,033 B2 | 7/2006 | Wilton et al. |
| 7,157,651 B2 | 1/2007 | Rix et al. |
| 7,243,083 B2 | 7/2007 | Burns et al. |
| 7,283,067 B2 | 10/2007 | Lutnick et al. |
| 7,392,212 B2 | 6/2008 | Hancock et al. |
| 7,392,214 B1 | 6/2008 | Fraser et al. |
| 7,392,217 B2 | 6/2008 | Gilbert et al. |
| 7,400,270 B2 | 7/2008 | Lutnick et al. |
| 7,496,533 B1 | 2/2009 | Keith |
| 7,523,064 B2 | 4/2009 | Burns et al. |
| 7,552,084 B2 | 6/2009 | Fraser et al. |
| 2001/0003179 A1 | 6/2001 | Martyn et al. |
| 2001/0032175 A1 | 10/2001 | Holden et al. |
| 2001/0037279 A1 | 11/2001 | Yeo |
| 2002/0023037 A1 | 2/2002 | White |
| 2002/0023042 A1 | 2/2002 | Solomon |
| 2002/0026321 A1 | 2/2002 | Faris et al. |
| 2002/0029180 A1 | 3/2002 | Kirwin et al. |
| 2002/0070915 A1 | 6/2002 | Mazza et al. |
| 2002/0073014 A1 | 6/2002 | Gilbert |
| 2002/0082976 A1 | 6/2002 | Howorka |
| 2002/0091626 A1 | 7/2002 | Johnson et al. |
| 2002/0107784 A1 | 8/2002 | Hancock et al. |
| 2002/0128945 A1 | 9/2002 | Moss et al. |
| 2002/0143690 A1 | 10/2002 | Mahajan et al. |
| 2002/0154038 A1 | 10/2002 | Houston |
| 2002/0156716 A1* | 10/2002 | Adatia ............................ 705/37 |
| 2002/0161690 A1 | 10/2002 | McCarthy et al. |
| 2002/0178104 A1 | 11/2002 | Hausman |
| 2002/0198815 A1 | 12/2002 | Greifeld et al. |
| 2003/0004862 A1 | 1/2003 | Lutnick et al. |
| 2003/0009411 A1 | 1/2003 | Ram et al. |
| 2003/0033239 A1 | 2/2003 | Gilbert |
| 2003/0050888 A1 | 3/2003 | Satow et al. |
| 2003/0065613 A1 | 4/2003 | Smith |
| 2003/0083976 A1 | 5/2003 | McLister |
| 2003/0097323 A1 | 5/2003 | Khalfan et al. |
| 2003/0229571 A1 | 12/2003 | May |
| 2003/0229900 A1 | 12/2003 | Reisman |
| 2003/0236737 A1 | 12/2003 | Kemp et al. |
| 2004/0030634 A1 | 2/2004 | Satow |
| 2004/0034591 A1 | 2/2004 | Waelbroeck et al. |
| 2004/0044610 A1 | 3/2004 | Fraser et al. |
| 2004/0059666 A1* | 3/2004 | Waelbroeck et al. ........... 705/37 |
| 2004/0117292 A1 | 6/2004 | Brumfield et al. |
| 2004/0117331 A1 | 6/2004 | Lutnick et al. |
| 2004/0140998 A1 | 7/2004 | Gravina et al. |
| 2004/0158519 A1 | 8/2004 | Lutnick et al. |

| | | | |
|---|---|---|---|
| 2004/0193519 A1* | 9/2004 | Sweeting et al. ............... 705/35 |
| 2004/0210504 A1 | 10/2004 | Rutman |
| 2004/0210511 A1 | 10/2004 | Waelbroeck et al. |
| 2004/0210512 A1* | 10/2004 | Fraser et al. ................... 705/37 |
| 2004/0218963 A1 | 11/2004 | Van Diepen et al. |
| 2005/0004852 A1 | 1/2005 | Whitney |
| 2005/0038731 A1 | 2/2005 | Sweeting et al. |
| 2005/0038732 A1 | 2/2005 | Sweeting et al. |
| 2005/0055304 A1* | 3/2005 | Lutnick et al. ................. 705/37 |
| 2005/0075966 A1 | 4/2005 | Duka |
| 2005/0108079 A1 | 5/2005 | Langridge |
| 2005/0108653 A1 | 5/2005 | Langridge |
| 2005/0119966 A1* | 6/2005 | Sandholm et al. .............. 705/37 |
| 2005/0160032 A1 | 7/2005 | Lutnick et al. |
| 2005/0171895 A1 | 8/2005 | Howorka et al. |
| 2005/0216393 A1 | 9/2005 | Lutnick et al. |
| 2005/0222941 A1 | 10/2005 | Tull, Jr. |
| 2006/0059079 A1 | 3/2006 | Howorka |
| 2006/0069635 A1 | 3/2006 | Ram et al. |
| 2006/0080214 A1 | 4/2006 | Hausman et al. |
| 2006/0086726 A1 | 4/2006 | Yamamoto et al. |
| 2006/0229967 A1 | 10/2006 | Sweeting |
| 2006/0265304 A1 | 11/2006 | Brumfield et al. |
| 2006/0265305 A1 | 11/2006 | Schluetter et al. |
| 2006/0271475 A1 | 11/2006 | Brumfield et al. |
| 2006/0277136 A1 | 12/2006 | O'Connor et al. |
| 2007/0100735 A1 | 5/2007 | Kemp et al. |
| 2007/0150708 A1* | 6/2007 | Billeci ......................... 712/223 |
| 2007/0174162 A1 | 7/2007 | Lutnick et al. |
| 2007/0226120 A1 | 9/2007 | Nanjundamoorthy |
| 2007/0244795 A1 | 10/2007 | Lutnick et al. |
| 2007/0244796 A1 | 10/2007 | Lutnick et al. |
| 2007/0250438 A1 | 10/2007 | Fraser et al. |
| 2007/0255642 A1* | 11/2007 | Keith ............................. 705/37 |
| 2008/0071671 A1 | 3/2008 | Fraser et al. |
| 2008/0077523 A1 | 3/2008 | Fraser et al. |
| 2008/0140558 A1 | 6/2008 | Reuter et al. |
| 2009/0073004 A1 | 3/2009 | Lutnick et al. |

FOREIGN PATENT DOCUMENTS

| | | |
|---|---|---|
| EP | 0412308 | 2/1991 |
| EP | 0416482 | 3/1991 |
| EP | 0512702 | 11/1992 |
| EP | 0733963 B1 | 9/1996 |
| EP | 0828223 A2 | 3/1998 |
| EP | 0993995 B1 | 4/2000 |
| EP | 1006472 | 6/2000 |
| GB | 2256954 A | 12/1992 |
| GB | 2258061 | 1/1993 |
| GB | 2313276 | 11/1997 |
| JP | 358161068 | 9/1983 |
| JP | 59184929 | 10/1984 |
| JP | 62-256164 | 11/1987 |
| JP | 11-282600 | 3/1998 |
| JP | 2002-032565 | 7/2000 |
| JP | 2001-501333 | 1/2001 |
| KR | 1992-700435 | 2/1992 |
| WO | 85/04271 | 9/1985 |
| WO | 87/03115 | 5/1987 |
| WO | WO 93/15467 | 8/1993 |
| WO | WO 95/26005 | 9/1995 |
| WO | WO 96/05563 A1 | 2/1996 |
| WO | WO 96/34356 | 10/1996 |
| WO | WO 97/37315 | 10/1997 |
| WO | WO 98/26363 | 6/1998 |
| WO | WO 98/34187 | 8/1998 |
| WO | WO 98/49639 | 11/1998 |
| WO | WO 98/52133 | 11/1998 |
| WO | WO 99/19821 | 4/1999 |
| WO | WO 00/11588 | 3/2000 |
| WO | WO 00/26745 | 5/2000 |
| WO | WO/0150317 | 12/2000 |
| WO | WO 01/69366 | 9/2001 |
| WO | WO 03/026135 | 3/2003 |
| WO | WO/2006108158 | 4/2006 |

OTHER PUBLICATIONS

U.S. Appl. No. 11/328,814, filed Jan. 9, 2006, Lutnick, et al.
U.S. Appl. No. 11/621,547, filed Jan. 9, 2007, Lutnick, et al.
USPTO Office Action for U.S. Appl. No. 11/328,814, filed Jul. 7, 2008.
U.S. Appl. No. 11/621,546, filed Jan. 9, 2007, Lutnick, et. al.
USPTO Office Action for U.S. Appl. No. 11/621,546, filed Jul. 7, 2008.
U.S. Appl. No. 11/328,814, filed Jan. 9, 2006, Lutnick, et. al.
USPTO Office Action for U.S. Appl. No. 11/328,814, filed Apr. 10, 2009; 9 pages.
USPTO Office Action for U.S. Appl. No. 10/699,858, filed May 6, 2009; 8 pages.
USPTO Office Action for U.S. Appl. No. 11/080,322, filed Apr. 16, 2009; 10 pages.
USPTO Office Action for U.S. Appl. No. 10/382,527, filed May 12, 2009; 8 pages.
MAOI Technologies Announces IIVEeXCHANGE 2.1, PR Newswire, New York, Sep. 14, 1998, p. 1. Retrieved from ProQuest.
U.S. Appl. No. 09/553,423, filed Apr. 19, 2000, Fraser et al.
U.S. Appl. No. 11/947,231, filed Nov. 29, 2007, Fraser, et al.
U.S. Appl. No. 11/947,285, filed Nov. 29, 2007, Fraser, et al.
U.S. Appl. No. 11/947,347, filed Nov. 29, 2007, Fraser, et al.
U.S. Appl. No. 10/829,119, filed Apr. 20, 2004, Fraser, et. al.
USPTO Office Action for U.S. Appl. No. 09/859,661; Dec. 14, 2009; 10 pages.
USPTO Office Action for U.S. Appl. No. 10/699,859, Jun. 25, 2009 (17 pages).
AU Examiner Report for AU Application No. 2007204680; 4 pages; Aug. 11, 2010.
EP Office Action for Application No. 07710023.8; 3 pages; Sep. 6, 2010.
U.S. PTO Office Action for U.S. Appl. No. 11/760,508; 16 pages; Apr. 13, 2010.
U.S. PTO Office Action for U.S. Appl. No. 11/947,231; 7 pages; Apr. 15, 2010.
U.S. Appl. No. 12/051,708, filed Mar. 19, 2008; 16 pages.
U.S. Appl. No. 11/947,347, filed Apr. 28, 2010; 10 pages.
U.S. PTO Office Action for U.S. Appl. No. 12/051,708 dated Apr. 30, 2010; 6 pages.

* cited by examiner

| ITEM | MARKET | | | | LAST PRICE |
|---|---|---|---|---|---|
| 302<br>BOND<br>A | *100.21 − 100.22  127 x 60 306<br>　　304　　　　　　　　　　　301 | | | | 100.20<br>308 |
| | 100.20 − 100.23  30 x 30 | *3<br>1<br>100 | 2<br>22<br>30 | | |
| | 100.19 − 100.24  100 x 30 | | | | |
| | 310 | 312 | 314 | | |

FIG. 3

SYSTEMS AND METHODS FOR ESTABLISHING FIRST ON THE FOLLOW TRADING PRIORITY IN ELECTRONIC TRADING SYSTEMS

CROSS REFERENCE TO RELATED APPLICATION

This application is a continuation in part of co-pending U.S. patent application Ser. No. 11/328,814, filed Jan. 9, 2006, which is hereby incorporated by reference herein in its entirety.

GUIDELINES FOR INTERPRETING THE PRESENT APPLICATION

Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things), means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things, does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

Indication

The term "indication" is used in an extremely broad sense. The term "indication" may, among other things, encompass a sign, symptom, or token of something else.

The term "indication" may be used to refer to any indicia and/or other information indicative of or associated with a subject, item, entity, and/or other object and/or idea.

As used herein, the phrases "information indicative of" and "indicia" may be used to refer to any information that represents, describes, and/or is otherwise associated with a related entity, subject, or object.

Indicia of information may include, for example, a code, a reference, a link, a signal, an identifier, and/or any combination thereof and/or any other informative representation associated with the information.

In some embodiments, indicia of information (or indicative of the information) may be or include the information itself and/or any portion or component of the information. In some embodiments, an indication may include a request, a solicitation, a broadcast, and/or any other form of information gathering and/or dissemination.

Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g., weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a particular sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

U.S.C. §112 Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

Incorporation by Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application.

INTRODUCTION

The present invention relates to electronic systems and methods for obtaining trading exclusivity and/or trading priority in electronic trading systems.

BACKGROUND OF THE INVENTION

In electronic trading systems that include bids and offers for items, a bid or offer that is entered by a participant may typically be entered as available (referred to alternatively hereinafter as "clear") to trade to other participants. Nevertheless, certain known trading systems may restrict the availability to certain participant(s) under certain conditions. For example, a Bid/Offer may be available only to the current market participants, i.e., those with current commitments (bids/offers). Accordingly, preferably only those customers with current participation can hit or lift these incoming entries. Such bids/offers may be considered unclear—i.e., not available to all trading participants.

In one type of trading system, the uncleared bids become available to participants other than the current participants only after a preset or predetermined time interval has expired (tracked by a internal system clock or other suitable device).

One criteria that may affect order priority—e.g., the exclusive right of certain participants to trade on incoming orders—is the respective priority of participants following the transition from a first trading state to a second trading state. For the purposes of this application, a trading state is defined as a set of rules or conditions that govern the interaction between trading participants.

It would be desirable to provide systems and methods that further define the rules or conditions that govern the interaction between trading participants when the system transitions from one trading state to a second trading state.

SUMMARY OF THE INVENTION

It would be desirable to provide systems and methods that further define the rules or conditions that govern the interaction between trading participants when the system transitions from one trading state to a second trading state.

Systems and methods for trading an item in an electronic trading system are provided. A method according to the invention preferably includes transitioning the trading system from a first trading state to a second trading state. Once the trading system has transitioned to the second state, the method includes determining whether an existing order qualifies for trading rights—i.e., trading priority and/or exclusivity—in the second trading state. This determining of trading rights in the second trading state is preferably based on the status of trading rights in the first trading state and also a set of predetermined criteria with respect to an incoming contra order—i.e., an order on the other side of a trade or active market (e.g., a bid is contra to an offer or other instruction to sell, an offer is contra to a bid or instruction to buy)—in the second trading state. If the existing order qualifies for trading rights, then the system preferably presents the incoming contra order for trading exclusively or semi-exclusively to the participant associated with the existing order.

BRIEF DESCRIPTION OF THE DRAWINGS

Further features of the invention, its nature and various advantages will be apparent from the following detailed description of the preferred embodiments, taken in conjunction with the accompanying drawings, in which like reference characters refer to like parts throughout, and in which:

FIG. 3 is an illustration of an electronic trading interface in accordance with some embodiments of the present invention.

DETAILED DESCRIPTION OF THE INVENTION

Figure 1:
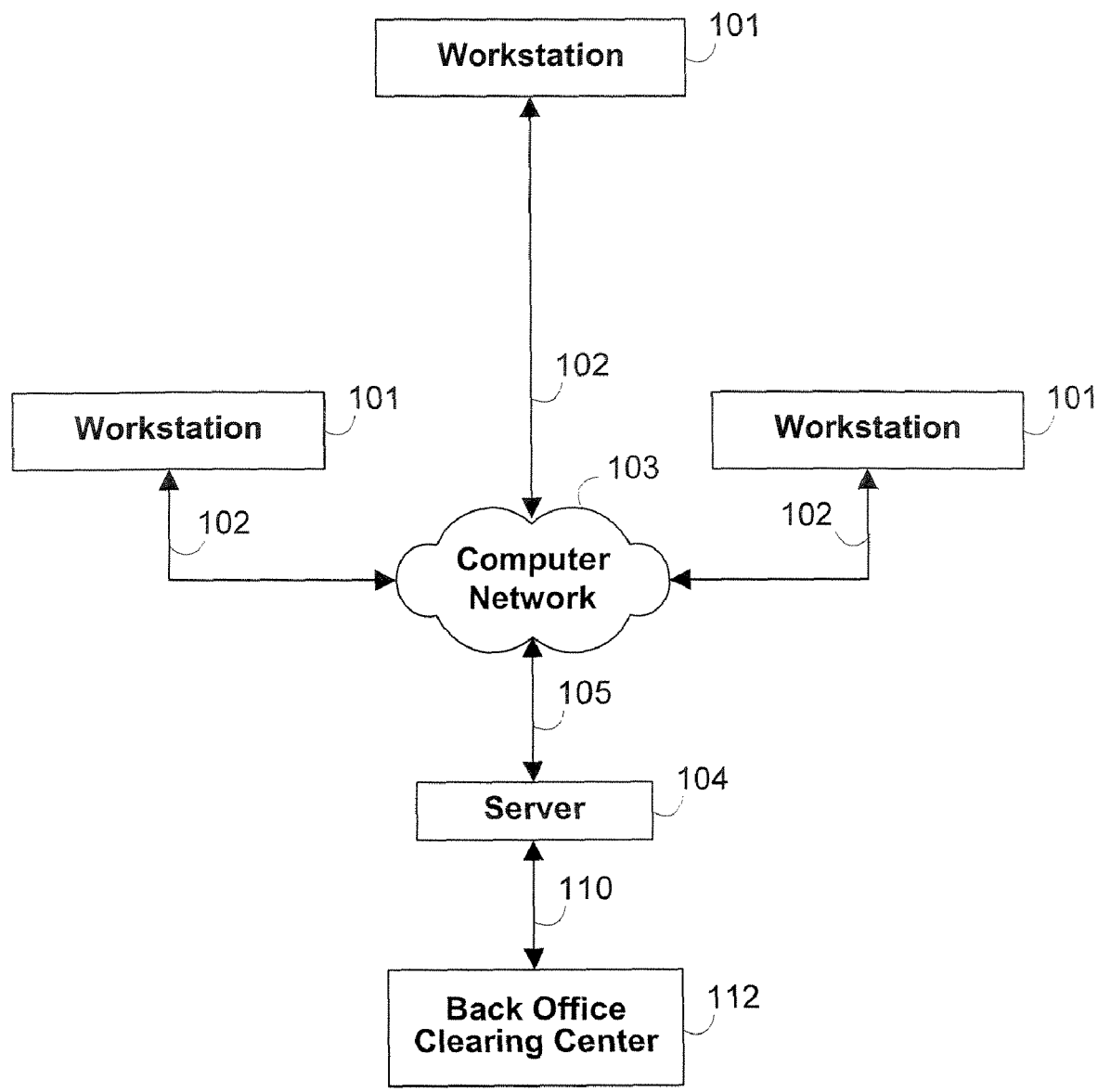
FIG. 1 is an illustration of an electronic implementation of a system in accordance with some embodiments of the present invention.

In one aspect of the invention, trading rules according to the invention disclosed herein relate to being "first-on-the-follow". These first-on-the-follow rules relate to the respective priority of participants following the transition from a first trading state to a second trading state (for the purposes of this application, a trading state is defined as a set of rules or conditions that govern the interaction between trading participants—transition from one trading state to a second trading state signifies transitioning from one set of rules or conditions to a second set of rules or conditions). First-on-the-follow rules relate in large part to identifying the participant that will have the right to trade exclusively (semi-exclusively)—i.e., the exclusive bidder on incoming offers and the exclusive offeror on incoming bids—at the commencement of the new state. It should be noted that in some embodiments of the invention, the first on the follow participant may be granted exclusive or semi-exclusive rights, depending on the rules of the trading system. Any references herein, or in the figures, to exclusive rights should be understood to refer to either an exclusive or semi-exclusive set of rights.

Typically, first-on-the-follow priority rights are obtained by the participants identified as the best bidder and the best offeror (the term best being defined as highest bidder/buyer with respect to price/time priority and lowest offeror/seller with respect to price/time priority) at the conclusion of the first trade state. In first-on-the-follow rules according to the invention, participants that were previously identified as the best bidder and best offeror at the conclusion of the first trade state may only obtain the first-on-the-follow rights in the second trade state if the best bidder and the best offeror satisfy either a certain minimum order size requirement, are within a certain predetermined delta (as described in more detail below) of the best bidder and the best offeror, respectively, or satisfy a combination of the minimum order size requirement and the predetermined delta restriction.

Alternatively, an additional restriction with respect to obtaining first-on-the-follow rights may relate to the amount purchased or sold during the first trade state by the prospective first-on-the-follow participant. It should be noted that first-on-the follow rights may obtain a particular advantage for the participant at least because these rights, in some embodiments of the invention, may entitle the participants to priority with respect to any incoming orders at the commencement of the second trading state.

With respect to hidden size, as described below, a participant's hidden size may be considered in satisfying the participant's minimum size requirement for obtaining first-on-the-follow rights.

In yet another rule according to the invention, if a participant satisfies first-on-the-follow requirements, then the participant may have a preset instruction to the system to either reduce his bid by a predetermined increment or increase his offer by an increment in the second trading state. Preferably, the respective increase or decrease reduces his exposure to an incoming order while maintaining his first-on-the-follow position, and the trading privileges, such as, for example, the exclusive right to trade against incoming orders, associated therewith. Alternatively, exposure may be reduced by reducing the size of the first on the follow order.

In an alternative embodiment, the order that is first-on-the-follow should preferably be within a predetermined delta of the best contra order, or the incoming order should preferably satisfy some combination of the threshold size and the predetermined delta in order to only be shown to or, alternatively, to only be available to be traded by, select participants that are first on the follow.

With respect to yet another embodiment of the invention, hidden size—i.e., a portion of the order that is not shown to the rest of the participants, but, if acted upon, is tradable—may also count toward satisfying the minimum size requirement of the order either as the first on the follow order or the current order in the system.

Yet another aspect of the invention provides rules associated with a method that restricts all incoming orders to a select number of traders. For example, the exclusive bidder or offeror preferably has an option to exclusively trade on an incoming order, although another participant is behind the exclusive bidder or offeror and has the ability to indicate a willingness to hit the incoming bid or lift the incoming offer if the exclusive bidder or offeror refuses to act on the incoming order. In one rule according to the invention, the exclusive bidder or offeror may preferably set, or have set, his respective default position to trade on an incoming bid or offer when there is another participant who has indicated a willingness to hit the incoming bid or lift the incoming offer. Thus, the default position becomes a "take when (another party has indicated that he is willing . . . ) taken" or "hit when (another party has indicated that he is willing . . . ) hit."

This rule may preferably be implemented in at least a state where bids and offers are posted—i.e., a bid/offer state—as well as a state wherein trades actually occur and bids and offers are matched.

It should be noted that the default position described herein for the take-when-taken or hit-when-hit order may preferably be further restricted to only act when the incoming order is a predetermined delta, as described in more detail above, from the headline price (see element 304 in FIG. 3) in bid/offer state, or the trading price in the state in which matches occur.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, or data processing device, or combination of the same. Server 104 and back office clearing center 112 may form part of the electronic trading system. Furthermore, server 104 may also contain an electronic trading system and application programming interface and merely transmit a Graphical User Interface or other display screens to the user at the user workstation, or the Graphical User Interface may reside on Workstation 101.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard 15 wired links, etc.

Workstations 101 may be personal computers, laptop computers, mainframe computers, dumb terminals, data displays, Internet browsers, Personal Digital Assistants (PDAs), two-way pagers, wireless terminals, portable telephones, programmed computers having memory, the programmed computer using the memory for implementing trading models, etc., or any combination of the same. Workstations 101 may be used to implement the electronic trading system application and application programming interface according to the invention.

Back office clearing center 112 may be any suitable equipment, such as a computer, a laptop computer, a mainframe computer, etc., or any combination of the same, for causing transactions to be cleared through a clearinghouse and/or verifying that transactions are cleared through a clearinghouse. (This clearing is not to be confused with being clear to trade, which is defined in more detail above.) Communications link 110 may be any communications links suitable for communicating data between server 104 and back office clearing center 112, such as network links, dial-up links, wireless links, hard-wired links, etc.

Figure 2:
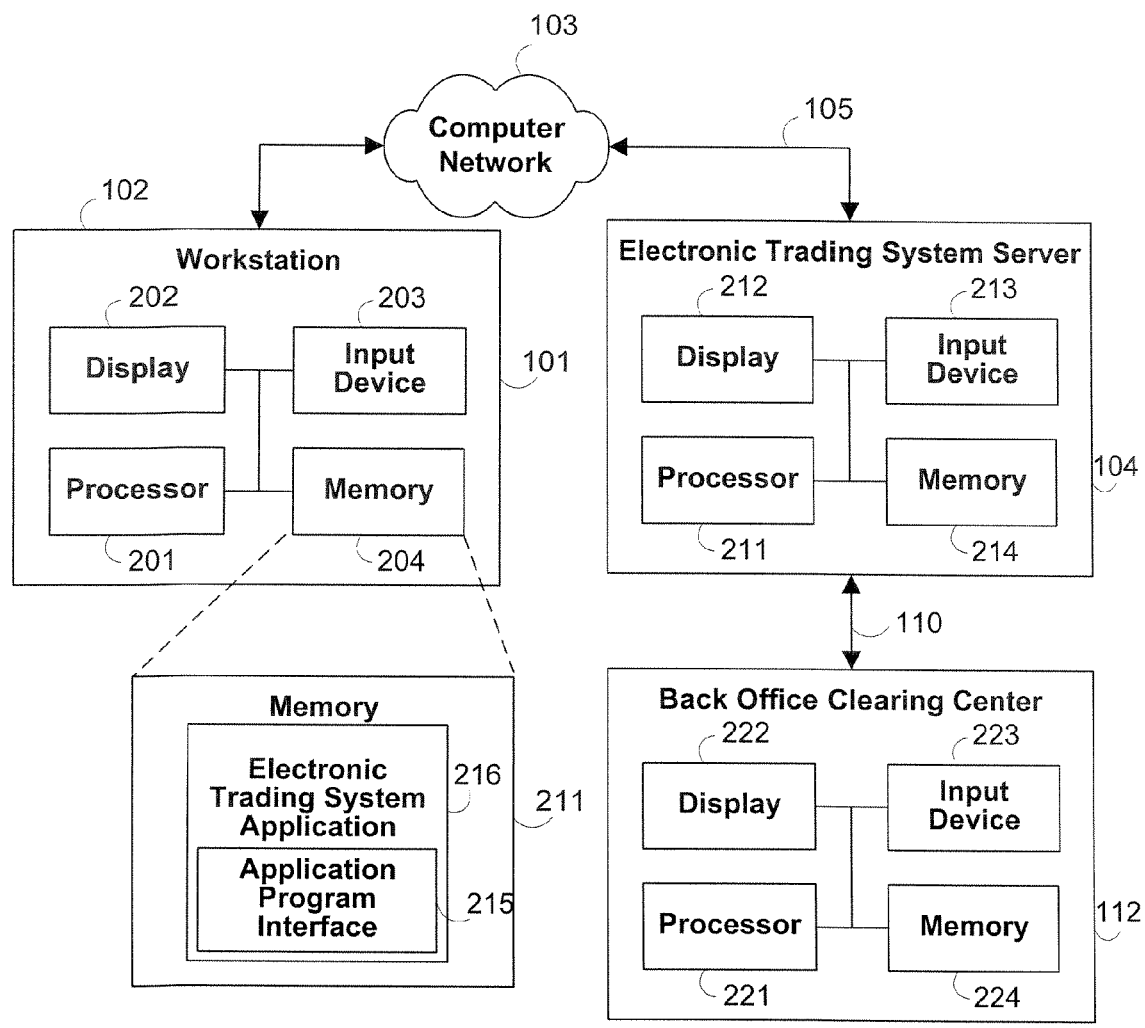
FIG. 2 is an illustration, in greater detail, of an electronic implementation of a system in accordance with some embodiments of the present invention.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. The storage device may include software stored on a suitable storage medium such as a disk. Memory 204 also preferably contains an electronic trading system application 216 according to the invention.

Electronic trading system application 216 may preferably include application program interface 215, or alternatively, as described above, electronic trading system application 216 may be resident in the memory of server 104. In this embodiment, the electronic trading system may contain application program interface 215 as a discrete application from the electronic trading system application which also may be included therein. The only distribution to the user may then be a Graphical User Interface which allows the user to interact with electronic trading system application 216 resident at server 104.

Processor 201 uses the workstation program to present on display 202 electronic trading system application information relating to market conditions received through communication link 102 and trading commands and values transmitted by a user of workstation 101. Furthermore, input device 203 may be used to manually enter commands and values in order for these commands and values to be communicated to the electronic trading system.

FIG. 3 shows an illustrative trading interface 300. Interface 300 is preferably for interactive trading and is adapted for implementing systems and methods according to the present invention. The interface includes a top line 301 (alternatively referred to herein as the touch line, or the headline.) Top line 301 may preferably be adapted to include the price that should be initially aggressed to start a trade or, alternatively, top line 301 may show the status of the actual aggressed trade. In either case, top line 301 is typically located at the top of the quad (quad being defined for purposes of this application as the display area related to trading of a particular instrument.) Top line 301 may include item 302, price 304, size 306 and last price 308. Interface 300 also includes market depth information 310, which shows price and size for items that have not yet been traded (commonly referred to as the order book, or, simply, the book). Also shown in interface 300 are bid and offer stacks 312 and 314, respectively. Bid and offer stacks 312 and 314 may indicate the size of one or many market participants that are bidding or offering at the current price 304. Note that price 304 in this exemplary example is shown in a traditional United States Government Bond pricing format.

Typically, an incoming order that is not clear to trade is indicated by a visual indicator—e.g., an asterisk preferably adjacent to the price associated with the new order (See, asterisk adjacent to price 304 in FIG. 3). In the embodiment shown in FIG. 3, in the particular circumstance where only a portion of an order is not cleared to trade, a visual indicator may be displayed in bid and offer stacks 312 and 314 adjacent the volume of the partially cleared order to indicate that only a portion of the order is cleared to be traded, or in some other suitable location which differentiates the partially cleared order from the totally uncleared order or from the totally clear order.

Figure 4:
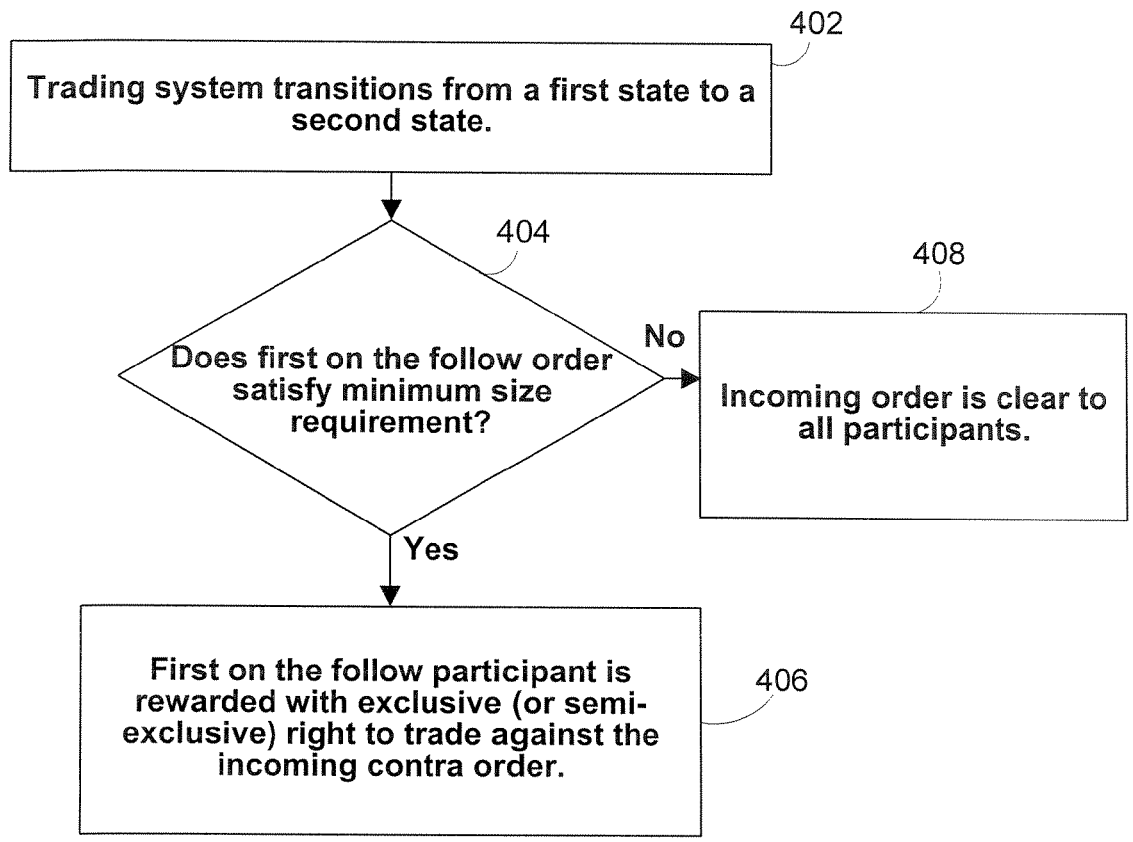
FIGS. 4-11 are flowcharts of various methods according to the invention.

FIG. 4 is a flow chart that describes one embodiment of a method according to the invention. Step 402 shows that the trading system transitions from a first state to a second state. The interface in FIG. 3 may show a trading state such as a bid/offer state in which participants enter their respective bids and offers. Other states may include a trading state wherein certain of the participants may engage in trading and subsequent negotiations associated therewith. These and other exemplary states are described in detail in U.S. Pat. No. 6,560,580 which is hereby incorporated by reference in its entirety. Following the conclusion of activity or other termination of the trading state that allows trading and negotiation between participants, the system may transition to a bid/offer state or to some other suitable trading state. As such, the trader with first on the follow priority may enjoy exclusive trading rights to trade on incoming contra orders when the system transitions a trading state to bid/offer state.

Step 404 queries whether a first on the follow order in the system satisfies a minimum size requirement. Step 406 shows that, if the first on the follow order satisfies the minimum size requirement, then the participant associated with the first on the follow order is rewarded with exclusive rights to trade against the incoming contra order (assuming, in certain embodiments, that the incoming order has price/time priority over other current orders and that the incoming order also satisfies the minimum size requirement, see FIGS. 7-9, and the corresponding text).

It should be noted that each of FIGS. 4-9 share similar steps X02, X06, and X08. The FIGs. are differentiated, for the most part, based on the query step of X04 in which each flow chart describes a unique query.

Figure 5:
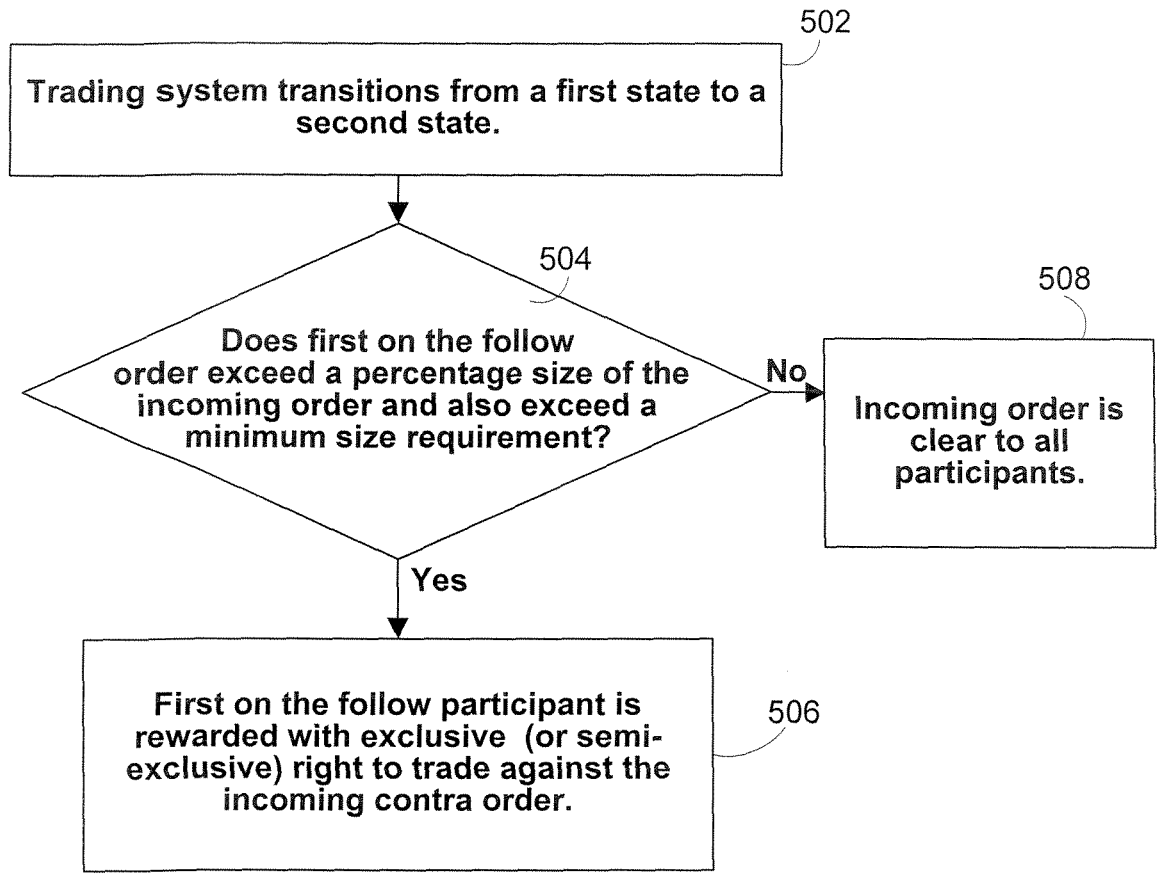

FIG. 5 is a flow chart describing another embodiment of a method according to the invention. Query step 504 queries whether a first on the follow order exceeds a percentage size of the incoming order and also exceeds a minimum size requirement. If the first on the follow order does satisfy the query, then the first on the follow participant associated with the first on the follow order may, under certain circumstances, be awarded an exclusive or semi-exclusive right to trade with the incoming order.

Figure 6:
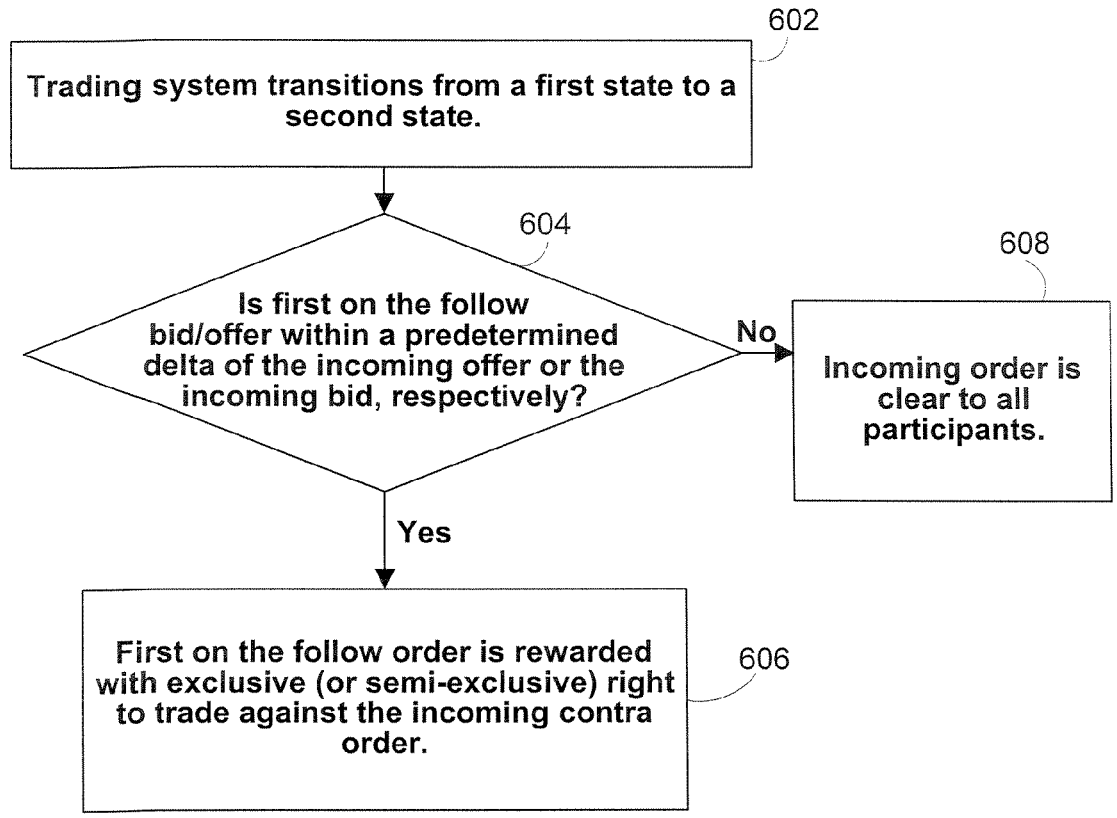

FIG. 6 is a flow chart describing yet another embodiment of a method according to the invention. Query step 604 queries whether any first on the follow order is within a predetermined delta, as described in more detail above, of the incoming bid or the incoming offer. If the first on the follow order is within the predetermined delta, then the first on the follow participant associated with the first on the follow order may, under certain circumstances, be awarded an exclusive or semi-exclusive right to trade with the incoming order.

Figure 7:
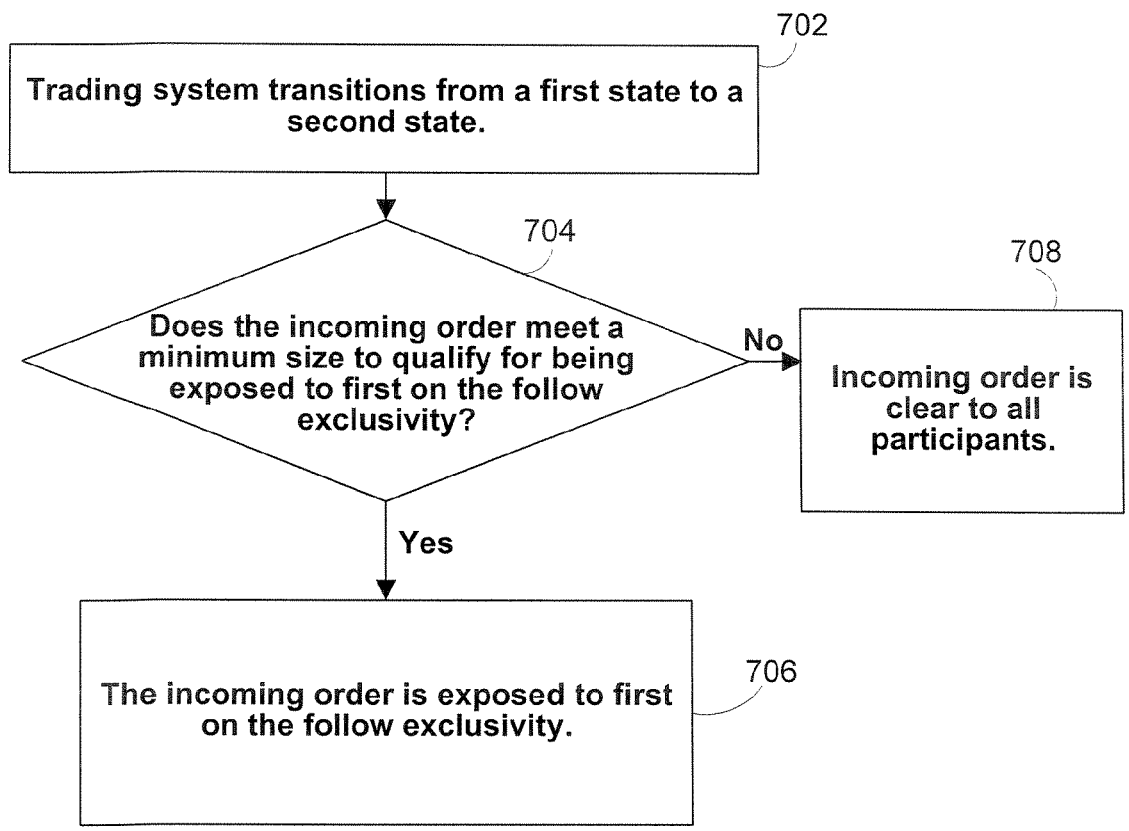

FIG. 7 is a flow chart describing still another embodiment of a method according to the invention. Step 704 queries whether an incoming order meets a minimum size to qualify for being clear only to a first on the follow participant or group of participants. If the incoming order meets the minimum size, then the incoming order may be clear to the first on the follow participant or group of participants (step 706).

Figure 8:
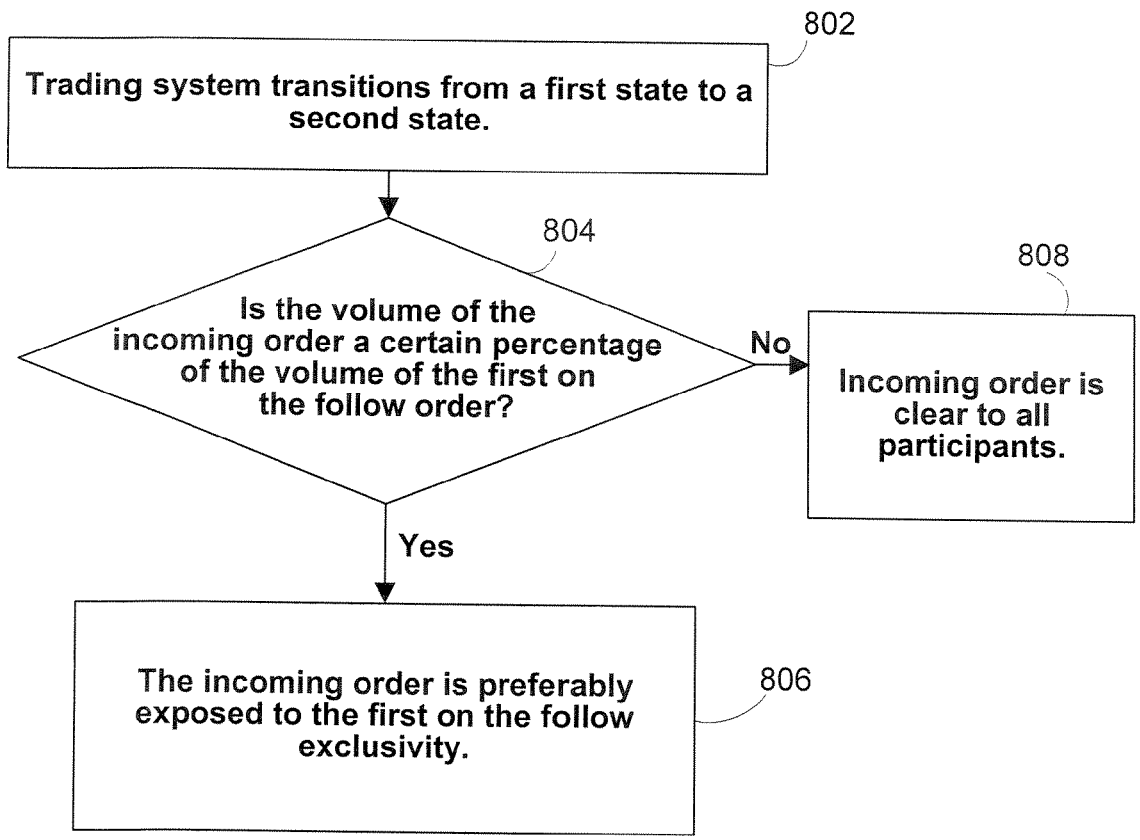

FIG. 8 is a flow chart describing yet another embodiment of a method according to the invention. Step 804 queries whether an incoming order includes a volume that is a certain, preferably predetermined, percentage (or other suitable metric) of the volume of the first on the follow contra order, then the incoming order may be clear to the first on the follow participant or group of participants. If the incoming order is a certain percentage of the first on the follow contra order, then the incoming order may be clear to the first on the follow participant or group of participants (step 806).

Figure 9:
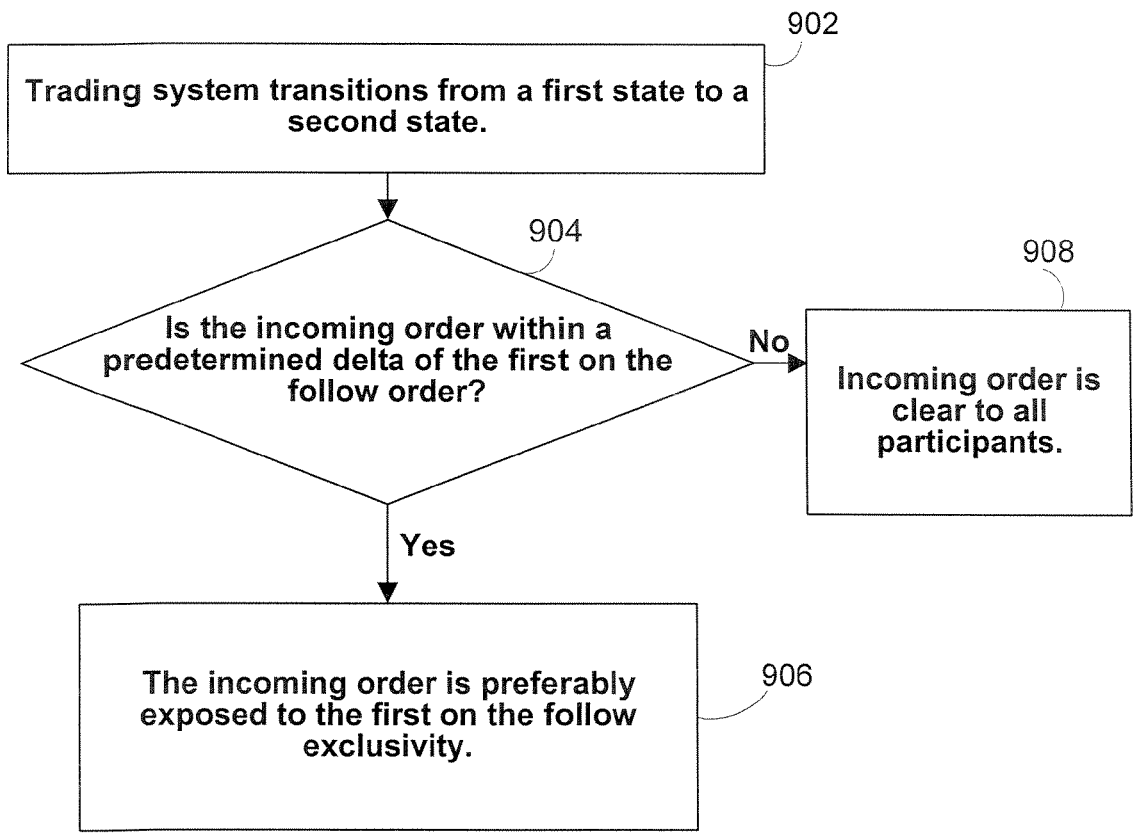

FIG. 9 is a flow chart describing another embodiment of a method according to the invention. Step 904 queries whether an incoming order is within a predetermined delta of the first on the follow order. If the incoming order is within a predetermined delta of the first on the follow contra order, then the incoming order may be clear to the first on the follow participant or group of participants (step 906).

It should be noted that each of the different query steps in FIGS. 4-9 may be used simultaneously with one another to provide multiple queries that are combined to determine whether any first on the follow order or, alternatively, any incoming order, is rewarded with exclusivity. Thus, the trading system may query numerous different queries before a current participant associated with a current order is awarded exclusive or semi-exclusive rights to trade with an incoming order.

Figure 10:
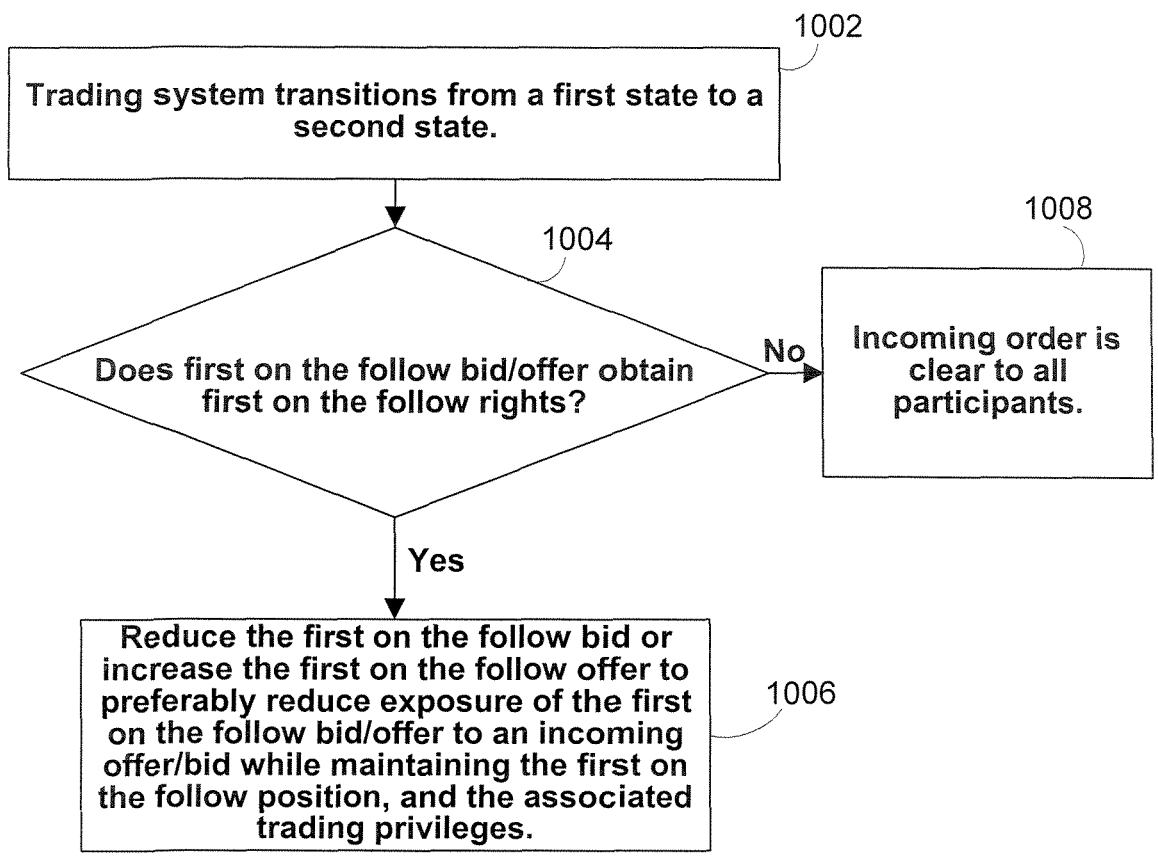

FIG. 10 shows a flow chart that includes step 1004 that queries whether first on the follow rights have been obtained. If first on the follow rights have been obtained by a participant, then step 1006 teaches that either a pre-set system default, or a participant-set feature, may reduce the first on the follow bid or increase the first on the follow offer to preferably reduce exposure to any incoming offer/bid, while maintaining the first on the follow position, and the associated trading privileges. Exposure may also be reduced by decreasing the size of the first on the follow bid or offer. This reduction may be implemented independently or together with a price adjustment as described above.

Figure 11:
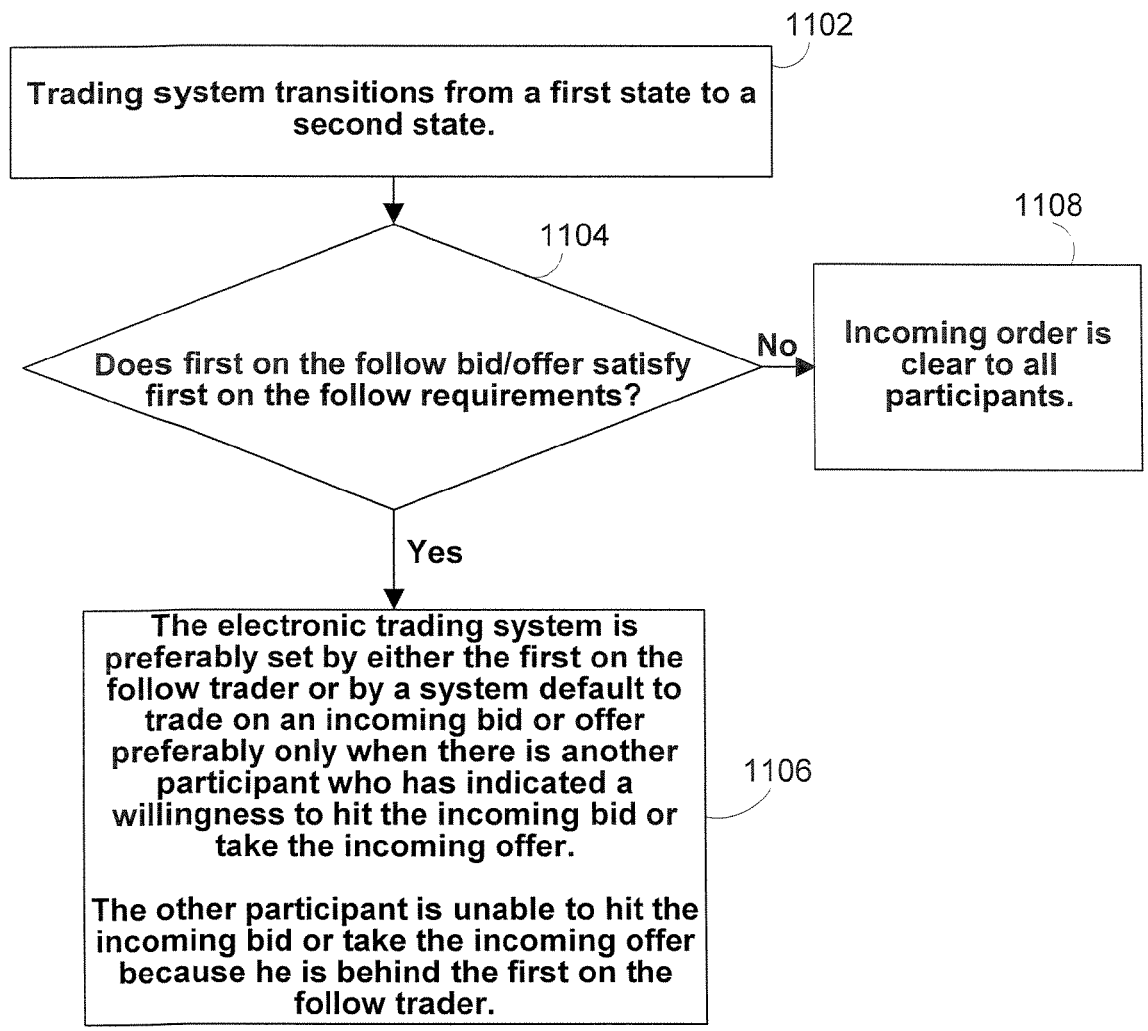

FIG. 11 shows a flow chart of yet another feature of the present invention. In this feature, step 1104 queries whether first on the follow rights have been obtained by satisfying certain criteria. If first on the follow rights have been obtained, then step 1106 teaches that the electronic trading system is preferably set by either the first on the follow trader or by a system default to trade on an incoming bid or offer preferably only when there is another participant who has indicated a willingness to hit the incoming bid or take the incoming offer. The other participant is preferably unable to hit the incoming bid or take the incoming offer because he is behind, with respect to trading priority, the first on the follow trader.

It should be noted that this particular feature is not limited to first-on-the-follow but, in fact, extends to any suitable trading situation. Thus, any bid or offer could be placed whereby the bid is only active if another bid, having inferior trading rights because, for example, the inferior bid was later in time, is at the same price and has indicated a willingness to trade.

As such, according to an embodiment of the invention as shown in FIG. 4, the trading system may be in a first state, such as a state that allows trading and negotiation between participants (hereinafter referred to as a trading/negotiation state). At the conclusion of this state, the system may transition to a second state, such as a bid/offer state. At the transition, the system may initially identify/determine a first-on-the-follow order/bid, which may be a bid from among existing/pending bids at the completion of the trading/negotiation state, and award the participant associated with this bid with exclusive first-on-the-follow rights in the bid/offer state with respect to an incoming contra order/offer (e.g., a trading priority in the second state, such as an exclusive right to trade on an incoming contra order/offer) if the size of the bid satisfies a minimum size requirement. As an example, the exclusive first-on-the-follow rights may be such that the incoming contra offer is only shown to the participant and/or is only available to be traded on by the participant. According to an embodiment of the invention, a hidden size of the bid may also count towards satisfying the minimum size requirement. According to an embodiment of the invention, if the first-on-the-follow bid does not satisfy a minimum size requirement, no participant on the bid side of the market may be awarded exclusive first-on-the-follow rights and the incoming offers may be clear to all participants. Similarly, at the transition of the trading/negotiation state to the bid/offer state the system may also identify a first-on-the-follow order/offer, which may be an offer from among the existing/pending offers, and award the participant associated with this offer with exclusive first-on-the-follow rights in the bid/offer state with respect to an incoming contra order/bid (e.g., a trading priority in the second state, such as an exclusive right to trade to trade on the incoming contra order/bid) if the size of the offer satisfies a minimum size requirement. Again, a hidden size of the offer may also count towards satisfying the minimum size requirement. If the first-on-the-follow offer does not satisfy a minimum size requirement, no participant on the offer side of the market may be rewarded first-on-the-follow rights and all incoming bids may be clear to all participants.

According to an embodiment of the invention, a first-on-the-follow bid and a first-on-the-follow offer may be identified/determined at the transition from a first state to a second state based on a status of trading rights in the first state. A status of trading rights in the first state may include a prioritization, at the completion of the first state, of participants based on a prioritization (e.g., resulting from this first state) of the existing/pending bids, and similarly the existing/pending offers, associated with these participants. For example, a prioritization among existing bids, and similarly existing offers, may be based on price and time. Here, a best existing bid/offer may be the bid/offer with the most aggressive price and if the same price then the "best" or oldest price time priority. As stated before, traditionally the best bid is the highest bid price and the best offer the lowest offer price (commonly referred to as "Dollar Price") but, alternatively, for securities whereby their price is expressed inversely (for example securities priced in terms of yield), prioritization among existing bids, and similarly existing offers, may be reversed and as such, a best existing bid may be the bid with the most aggressive lowest yield (e.g., a best existing bid may be a bid with the lowest yield a bidder may accept) and a best existing offer may be the offer with the most aggressive highest yield (e.g. a best existing offer may be an offer with the highest yield a seller may sell securities at). For description purposes, the present invention will be described with respect to securities that are expressed as prices ("Dollar Price"). However, one skilled in the art will recognize that the present invention is also applicable to securities whereby their price is expressed in terms of yield.

According to one embodiment of the invention, at the transition from a first state, such as a trading/negotiation state, to a second state, such as a bid/offer state, the best existing bid may be identified as the first-on-the-follow bid and the best existing offer may be identified as the first-on-the-follow offer (again, one skilled in the art will recognize that other criteria may be used). One skilled in the art will recognize that an existing bid and an existing offer may be a best bid and a best offer as a result of various transactions during a trading/negotiation state. For example, as disclosed in U.S. Pat. No. 6,560,580, a bid and/or an offer during a trading/negotiation state may not be filled and/or completely filled resulting in the bid and/or offer being an existing best bid/existing best offer in the immediately subsequent bid/offer state. Similarly, a hit (sell) and/or take/lift (buy) during a trading/negotiation state may not be filled and/or completely filled resulting in the hit and/or take being an existing best bid/existing best offer in the immediately subsequent bid/offer state. According to an embodiment of the invention and as discussed above, if the size of the best existing bid satisfies a minimum size requirement, the participant associated with this bid may be awarded first-on-the-follow rights in the bid/offer state (e.g., an exclusive right to trade with an incoming contra offer). Alternatively, if the size of the best existing bid does not satisfy a minimum size requirement, no participant on the bid side of the market may be rewarded first-on-the-follow rights and all incoming offers may be clear to all participants. Similarly, if the size of the best existing offer satisfies a minimum size requirement, the participant associated with this offer may be rewarded first-on-the-follow rights in the bid/offer state regarding an incoming contra bid. Alternatively, if the size of the best existing offer does not satisfy a minimum size requirement, no participant on the offer side of the market may be rewarded first-on-the-follow rights and all incoming bids may be clear to all participants.

According to another embodiment of the invention, if the bid identified as the first-on-the-follow bid does not satisfy a minimum size requirement, rather than awarding no participant with first-on-the follow rights, a different bid existing at the state transition may be identified as a first-on-the-follow bid (e.g., the bid with the next best price time priority). If the size of this second identified bid satisfies a minimum size requirement, the participant associated with the bid may be awarded with first-on-the-follow rights in the second state regarding an incoming contra offer. Alternatively, if the size of the bid does not satisfy a minimum size requirement, another bid existing at the state transition may be identified as a first-on-the-follow bid, etc. A similar procedure may be followed regarding a first-on-the-follow participant on the offer side of the market.

According to another embodiment of the invention, as the trading system transitions from a first state to a second state, the system may identify a first-on-the-follow bid (e.g., based on a status of trading rights in the first state), and award the participant associated with this bid with first-on-the-follow rights in the second state if the participant met certain transaction criteria in the first state. One skilled in the art will recognize that different transaction criteria may be used. According to one embodiment of the invention, the transaction criteria may be that the participant must have purchased at least a minimum size requirement in the first state. For example, according to one embodiment of the invention, as the trading system transitions from a first state, such as a trading/negotiation state, to a second state, such as a bid/offer state, the system may identify the best existing bid as the first-on-the-follow bid and award the participant associated with this bid with first-on-the-follow rights in the bid/offer state if the participant purchased at least a minimum size requirement in the preceding trading state. Similarly, as the trading system transitions from a first state, such as a trading/negotiation state, to a second state, such as a bid/offer state, the system may identify a first-on-the-follow offer (e.g., based on a status of trading rights in the first trading state, such as the best existing offer), and award the participant associated with this offer with first-on-the-follow rights in the second trading state if the participant sold a minimum size requirement in the first state.

According to an embodiment of the invention, if the participant associated with the identified first-on-the-follow bid/first-on-the-follow offer does not satisfy the transaction criteria from the first state (e.g., a minimum purchase/sell size requirement), no participant on the respective bid side/offer side of the market may be awarded first-on-the-follow rights and all incoming offers/bids may be clear to all participants.

According to another embodiment of the invention, if the participant associated with the identified first-on-the-follow bid/first-on-the-follow offer does not satisfy the transaction criteria from the first state, rather than awarding no participant with first-on-the follow rights on the respective side of the market, a different bid/offer may be identified as the first-on-the-follow bid/first-on-the-follow offer and the participant associated therewith awarded with first-on-the-follow rights in the second state if the participant met the transaction criteria in the first state (e.g., purchased/sold a minimum size requirement in the first state), etc.

According to another embodiment of the invention, as the trading system transitions from a first state, such as a trading/negotiation state, to a second state, such as a bid/offer state, the system may identify a first-on-the-follow bid (e.g., based on a status of trading rights in the first state, such as a best bid), and award the participant associated with this bid with first-on-the-follow rights in the bid/offer state if the price of the bid meets a price criteria with respect to a price of a trade in the trading state. One skilled in the art will recognize that different price criteria may be used. According to one embodiment of the invention, the price criteria may be that the price of the first-on-the-follow bid must within a predetermined price delta (e.g., difference) of a price of a trade in the trading state. Similarly, as the trading system transitions from a first state, such as a trading/negotiation state, to a second state, such as a bid/offer state, the system may also identify a first-on-the-follow offer (e.g., based on a status of trading rights in the first trading state, such as the best existing offer), and award the participant associated with this offer with first-on-the-follow rights in the second trading state if the offer meets a price criteria with respect to a price of a trade in the trading state.

According to an embodiment of the invention, the respective price in the first state to which the first-on-the-follow bid/first-on-the-follow offer may be compared may be a bid price, an offer price, a take price, and/or a hit price. According to another embodiment of the invention, the respective price from the trading state may be an average of multiple bid prices, offer prices, take prices, and/or hit prices. According to another embodiment of the invention, the respective price from the trading state may be an average of any combination of bid prices, offer prices, take prices, and/or hit prices. According to another embodiment of the invention, the respective price from the trading state may be a bid price, an offer price, a take price, and/or a hit price associated with a first or last trade in the trading state. One skilled in the art will recognize that other prices from the first state/trading state may be used.

According to an embodiment of the invention, if the identified first-on-the-follow bid/first-on-the-follow offer does not satisfy the price criteria, no participant on the respective bid side/offer side of the market may be awarded first-on-the-follow rights in the second state and all incoming offers/bids may be clear to all participants. According to another embodiment of the invention, if the identified first-on-the-follow bid/first-on-the-follow offer does not satisfy the price criteria, rather than awarding no participant with first-on-the follow rights on the respective side of the market, a different bid/offer may be identified as the first-on-the-follow bid/first-on-the-follow offer and the participant associated therewith awarded with first-on-the-follow rights in the second state if the first-on-the-follow bid/first-on-the-follow offer meets the price criteria, etc.

According to another embodiment of the invention, as the trading system transitions from a first state to a second state, the system may identify all participants with existing/pending bids, and award one of these identified participants with first-on-the-follow rights to exclusively trade against an incoming contra offer in the second state based on criteria related to transactions in the first state. Similarly, the system may identify all participants with existing offers, and reward one of these identified participants with first-on-the-follow rights to exclusively trade against an incoming contra bid in the second state based on criteria related to transactions in the first state. For example, according to an embodiment of the invention, the system may determine which participant among the identified participants purchased the most (and similarly sold the most) during the first state, and award that participant with first-on-the-follow rights in the second state. According to another embodiment of the invention, the system may determine which participant among the identified participants made the earliest (e.g., first) or the latest (e.g., last) purchase (and similarly the earliest or the latest sale) during the first state, and reward that participant with first-on-the-follow rights in the second state. According to a further embodiment of the invention, the system may determine which participant among the identified participants made the earliest or the latest purchase of at least a minimum size requirement (and similarly the earliest or the latest sale of at least a minimum size requirement) during the first state, and reward that participant with first-on-the-follow rights in the second state. One skilled in the art will recognize that other criteria based on transactions in the first state may be used to select a participant to be awarded with first-on-the-follow rights.

According to another embodiment of the invention, any combination of the above described ways, and other ways, for awarding a participant with first-on-the follow-rights in a second state may be used.

According to another embodiment of the invention as shown in FIG. 5, as the trading system transitions from a first state to a second state, the system may award a participant with an existing order (i.e., a first-on-the-follow bid/first-on-the-follow offer) with first-on-the-follow rights in the second state. However, these rights may not ascribe to the participant with respect to an incoming contra order unless the size of the first-on-the follow order associated with the participant meets a certain size criteria relative to the size of the incoming contra order.

According to an embodiment of the invention, any of the above described ways, and/or other ways, may be used to initially award a participant with first-on-on-the follow rights. As a further example, as the trading system transitions from a first state to a second state, the system may identify a first-on-the-follow order (e.g., based on a status of trading rights in the first state, such as the best bid/best offer) and award the participant associated with this order with first-on-the-follow rights in the second state. According to another embodiment of the invention and as shown in FIG. 5, for a participant to be initially awarded with first-on-the-follow-rights in the second state, the first-on-the-follow order associated with the participant must also exceed a minimum size requirement. According to an embodiment of the invention, a hidden size of the first-on-the-follow order may count toward satisfying the minimum size requirement. According to an embodiment of the invention, if the first-on-the-follow order does not satisfy the minimum size requirement, no participant on the respective side of the market may be awarded first-on-the-follow rights and an incoming contra order may be clear to all participants. Alternatively, according to another embodiment of the invention, a different participant may be awarded with first-on-the-follow rights. One skilled in the art will recognize that criteria other than and/or in addition to a minimum size requirement may need to be met before a participant is initially awarded with first-on-the-follow rights.

Again referring to FIG. 5, once initially awarding a participant with first-on-the-follow rights in the second state, when an incoming contra order is input into the trading system in the second state, if the size of the first-on-the follow order associated with the participant meets a certain size criteria relative to the size of the incoming contra order, the participant may be awarded exclusive first-on-the-follow rights on the incoming contra offer. For example, according to an embodiment of the invention, the size of the first-on-the follow order must exceed a percentage of the size of the incoming contra order for the participant to have exclusive rights to trade on the contra order. One skilled in the art will recognize that other size criteria may apply. According to an embodiment of the invention, a hidden size of the first-on-the-follow order may also count toward satisfying the size requirement of the order. According to an embodiment of the invention, if the size of the first-on-the-follow order does not meet the size criteria relative to the size of the incoming contra order, no participant on the respective side of the market may be rewarded first-on-the-follow rights and the incoming contra offer may be clear to all participants. Alternatively, according to another embodiment of the invention, a different participant may be awarded with first-on-the-follow rights with respect to the contra order.

According to another embodiment of the invention as shown in FIG. 6, as the trading system transitions from a first state to a second state, the system may award a participant with an existing order (i.e., a first-on-the-follow bid/first-on-the-follow offer) with first-on-the-follow rights in the second state. However, these rights may not ascribe to the participant with respect to an incoming contra order unless the price of the first-on-the follow order associated with the participant meets a certain price criteria relative to the price of the incoming contra order. Again, one skilled in the art will recognize that various ways may be used to initially award a participant with first-on-on-the follow rights as similarly discussed above with reference to FIG. 5. One skilled in the art will also recognize that additional criteria, such as a minimum size requirement, may need to be met for a participant to be initially awarded with first-on-the-follow rights, as similarly discussed above with reference to FIG. 5.

Again referring to FIG. 6, once initially awarding a participant with first-on-the-follow rights in the second state, when an incoming contra order is input into the trading system in the second state, if the price of the first-on-the follow order associated with the participant meets a certain price criteria relative to the price of the incoming contra order, the participant may be rewarded exclusive first-on-the-follow rights on the incoming order. For example, according to an embodiment of the invention, the price of the first-on-the follow order must be within a predetermined price delta (e.g., difference) from the price of the incoming contra order for the participant to have exclusive rights to trade on the contra order. One skilled in the art will recognize that other price criteria may apply. According to an embodiment of the invention, if the price of the first-on-the-follow order does not meet the price criteria relative to the price of the incoming contra order, no participant on the respective side of the market may be awarded first-on-the-follow rights and the incoming order may be clear to all participants. Alternatively, according to another embodiment of the invention, a different participant may be awarded with first-on-the-follow rights with respect to the contra order.

According to another embodiment of the invention, any combination of the various ways discussed above in reference to FIGS. 5 and 6 for ascribing first-on-the-follow rights to a participant with respect to an incoming contra order may be used.

According to another embodiment of the invention, if there are no existing bids and/or no existing offers when transitioning from a first state to a second state, no participant on the respective bid side and/or offer side of the market may be awarded first-on-the-follow rights upon transitioning from a first state, such as a trading/negotiation state, to the second state, such as a bid/offer state.

According to another embodiment of the invention, during a first state, such as a trading/negotiation state, a participant may have an order (e.g., bid, offer, hit, or take) that is completely filled. As a result, as the trading system transitions to a second state, such as a bid/offer state, the participant may have no existing order at that time and as such, may not be able to obtain first-on-the-follow rights upon transitioning to this second state as described above. According to an embodiment of the invention, as the trading system transitions from a first state to a second state, a participant that may or may not have an existing order, but satisfies a status of trading rights in the first state, such as had at least one trade matched in the first state, may be awarded with first-on-the-follow rights in the second state. According to another embodiment of the invention, such a participant may only be awarded with first-on-the-follow rights in the second state if the participant met one or more criteria related to transactions in the first state. For example, according to an embodiment of the invention, upon transitioning from a first state to a second state, a trading system may identify all participants that made a trade (e.g., as either a bid or take/as either an offer or hit) in the first state (whether or not they now have an existing order in the second state) and awarded one of these participants with first-on-the-follow rights in the second state on the respective side of the market based on, for example, criteria related to transactions in the first state.

According to an embodiment of the invention, various criteria related to transactions in the first state may be used to identify/award a participant with first-on-the-follow rights in the second state. For example, according to an embodiment of the invention, a participant may be awarded with first-on-the-follow rights if the participant made a first or last purchase in the first state, made a first or last purchase in the first state that also meets at least a minimum size requirement, made a purchase in the first state that also meets at least a minimum size requirement, purchased the most in the first state, made a first or last purchase in the first state that also meets a certain price requirement, and/or made a purchase in the first state that also meets a certain price requirement etc. Similar criteria may apply to sales. One skilled in the art will recognize that first-on-the-follow rights may be awarded in other ways.

According to an embodiment of the invention, if the participant awarded with the first-on-the-follow rights has an existing order, the participant may automatically be awarded the rights. Alternatively, if the participant awarded with the rights has no existing order, the participant may automatically be awarded with the first-on-the-follow rights without having to enter an order. With respect to first-on-the-follow rights that only ascribe to a participant once a contra order is input into the trading system as described with reference to FIGS. 5 and 6, for example, the participant may be considered to have an order at any price and size that is necessary to obtain the rights. Alternatively, the participant may be considered to have an order at a default price and size, either set by the trading system or specified by the participant.

According to another embodiment of the invention, if the participant awarded with the first-on-the-follow rights has no existing order, the participant may be given the option to obtain the rights. According to an embodiment of the invention, the participant may be given a predetermined time period to make such a decision. According to an embodiment of the invention, during this time period and prior to the participant making a decision, the participant may be awarded with the first-on-the-follow rights with respect to an incoming contra order. According to an embodiment of the invention, the participant may indicate a decision to obtain the first-on-the-follow rights without having to enter an order.

According to another embodiment of the invention, the participant may need to indicate a decision to obtain the first-on-the-follow rights by inputting, within the predetermined time period, any order or an order that meets certain criteria, such as an order at the current best price, an order at a best price, an order that has a size that satisfies a minimum size requirement, and/or an order at a price that meets a price criteria with respect to a price of a trade in the first state, etc. One skilled in the art will recognize that other criteria may apply. One skilled in the art will also recognize that a participant may indicate a decision to obtain first-on-the-follow rights in other ways.

According to an embodiment of the invention, if a participant is given the option to obtain the first-on-the-follow rights and decides not take accept the rights, no participant on the respective side of the market may be awarded with the rights. Alternatively, a different participant may be considered.

According to another embodiment of the invention, a plurality of participants (for example, two participants) on the same side of the market may be awarded first-on-the-follow rights to trade on an incoming contra order, resulting in each participant having semi-exclusive rights. For example, according to an embodiment of the invention, as the trading system transitions from a first state to a second state a first participant having an existing order, such as a bid, may be initially awarded with first-on-the-follow rights regarding an incoming contra order in the second state based on any of the above described ways, or other ways, for example. In addition, a second participant that has no existing order, such as a bid, but satisfies a status of trading rights in the first state, such as had at least one trade matched (e.g., bid/hit) in the first state, may be given the option to obtain the first-on-the-follow rights in the second state. According to another embodiment of the invention, such a participant may only be given the option if the participant met one or more criteria related to transactions in the first state. According to an embodiment of the invention, various criteria related to transactions in the first state may be used, as similarly described above (e.g., the participant may have made the first or last trade, may have made a trade and/or the first or last trade that also meets a minimum size and/or price requirement, and/or may have made the largest trade, and now has no remaining order). According to an embodiment of the invention, it is possible that no second participant is identified because, for example, no participant without an existing order meets certain designated criteria.

According to an embodiment of the invention, assuming a second participant is identified and is given the option to obtain the first-on-the-follow rights, the second participant may be given a predetermined time period to make such a decision. According to an embodiment of the invention, during this time period and prior to the second participant making a decision, this second participant and the first participant may each be awarded with first-on-the-follow rights with respect to an incoming contra order. As such, during this time period, the two participants may have trading priority/semi-exclusive rights. With respect to first-on-the-follow rights that only ascribe to a participant once a contra order is input into the trading system as described with reference to FIGS. 5 and 6, for example, the second participant may be considered to have an order at any price and size that is necessary to obtain the rights. Alternatively, the participant may be considered to have an order at a default price and size, either set by the trading system or specified by the participant.

According to an embodiment of the invention, preferably the participant first to act on an incoming contra order executes the order.

According to an embodiment of the invention, if the second participant decides to obtain the first-on-the-follow rights within the predetermined time period, this second participant may be awarded exclusive first-on-the-follow rights, with the first participant losing the rights. According to a further embodiment of the invention, if the second participant decides not to obtain the first-on-the-follow rights within the predetermined time period, this first participant may then be awarded exclusive first-on-the-follow rights.

According to one embodiment of the invention, for the second participant to indicate a decision to obtain the first-on-the-follow rights, the participant may need to input, within the predetermined time period, any order or alternatively, an order that meets certain criteria, as similarly described above. According to another embodiment of the invention, the participant may express a desire to obtain the rights without having to enter an order, as similarly described above. In the latter case, with respect to first-on-the-follow rights that only ascribe to a participant once a contra order is input into the trading system as described with reference to FIGS. 5 and 6, for example, the participant may be considered to have an order at any price and size that is necessary to obtain the rights. Alternatively, the participant may be considered to have an order at a default price and size, either set by the trading system or specified by the participant.

According to another embodiment of the invention, a participant awarded with exclusive/semi-exclusive first-on-the-follow rights as described above may hold these rights indefinitely until an incoming contra order at a best price (or alternatively, a best yield), for example, is input by another participant. Upon input of a contra order at the best price, the first-on-the-follow participant may have a predetermined amount of time in which the exclusive/semi-exclusive rights hold and in which to hit/take the contra order. If the participant does not hit/take the contra order during this time, the contra order may become available/clear to other participants. According to embodiment of the invention, if no other participant hits/takes the contra order, the original first-on-the-follow participant with exclusive/semi-exclusive first-on-the-follow rights may retain these rights with respect to a next subsequently incoming contra order at the best price. According to another embodiment of the invention, if no other participant hits/takes the contra order, the original first-on-the-follow participant with exclusive/semi-exclusive first-on-the-follow rights may not retain these rights with respect to the next subsequently incoming contra order at the best price.

According to another embodiment of the invention, while in the second state a participant that was awarded exclusive/semi-exclusive first-on-the-follow rights as discussed above may lose those rights (assuming there is currently no contra order to which the participant has rights) to a second participant as a result of, for example, the second participant inputting an order on the same side of the market. For example, the second participant may be awarded exclusive first-on-the-follow rights if the participant inputs a new best bid or a new best offer and/or the size of that new bid or new offer satisfies a minimum size requirement.

According to another embodiment of the invention, even though a participant may be awarded exclusive/semi-exclusive first-on-the-follow rights with respect to an incoming contra order in a second state, the participant may not have these rights with respect to a particular incoming contra order unless the order meets certain criteria. For example, according to an embodiment of the invention, for a participant to have first-on-the-follow rights to an incoming contra order the order must have price and/or time priority over other current contra orders. If the incoming order does not have price and/or time priority over other current contra orders, the order may be clear to all participants.

According to another embodiment of the invention as shown in FIG. 7, for a participant to have first-on-the-follow rights to an incoming contra order the order must satisfy at least a minimum size requirement (e.g., exceed a predetermined size requirement). According to an embodiment of the invention, a hidden size of the incoming contra order may also count towards satisfying the minimum size requirement. If the incoming order does not satisfy the minimum size requirement, the order may be clear to all participants. As such, a trading system according to an embodiment of the invention may effectively only ascribes first-on-the-follow rights when it is deemed worthwhile to do so.

According to another embodiment of the invention as shown in FIG. 8, for a participant to have first-on-the-follow rights to an incoming contra order the order must satisfy a size criteria relative to the size of the order of the first-on-the follow participant. For example, according to an embodiment of the invention, the size of the incoming contra order must exceed a predetermined percentage of the size of the first-on-the follow participant's order for the participant to have first-on-the-follow rights to the incoming contra order. One skilled in the art will recognize that other size criteria may apply. According to an embodiment of the invention, a hidden size of the incoming contra order may also count towards satisfying the size requirement. If the incoming order does not satisfy the size requirement, the order may be clear to all participants.

According to another embodiment of the invention as shown in FIG. 9, for a participant to have first-on-the-follow rights to an incoming contra order the order must satisfy a price criteria relative to the price of the order of the first-on-the follow participant. For example, according to an embodiment of the invention, the price of the incoming contra order must within a predetermined price delta (e.g., difference) of the price of the first-on-the follow participant's order for the participant to have first-on-the-follow rights to the incoming contra order. One skilled in the art will recognize that other price criteria may apply. According to an embodiment of the invention, if the incoming order does not satisfy the price criteria, the order may be clear to all participants.

According to another embodiment of the invention, for a participant to have first-on-the-follow rights to an incoming contra order the order must satisfy any combination of criteria, such as those discussed above.

According to another embodiment of the invention as shown in FIG. 10, for a participant that has an order (e.g., a first-on-the-follow order) and that obtains exclusive/semi-exclusive first-on-the-follow rights in the second state, to protect the participant's exposure the participant's order may be modified without affecting the participant's first-on-the-follow rights to trade on an incoming contra order. The participant's order may be modified such that the size of the order is reduced by some percentage amount, and/or the price of the order is increased (in the case of an offer)/decreased (in the case of a bid) by some price delta. According to an embodiment of the invention, the trading system may be configured to automatically modify the size and/or price of the order, each by a predetermined size percentage or price delta (which percentage or delta may be pre-configured in the system by an administrator, for example, or individually configured by each participant, for example). According to another embodiment of the invention, each participant may enable/disable the trading system to automatically modify the size and/or price of the participant's order, each by a predetermined size percentage or price delta (which percentage or delta may be configured by each participant, for example). According to another embodiment of the invention, upon the participant obtaining the first-on-the-follow rights, for example, the trading system may prompt the participant to modify the size and/or price of the participant's order.

According to an embodiment of the invention, with respect to first-on-the-follow rights that only ascribe to a participant once a contra order is input into the trading system as described with reference to FIGS. 5 and 6, for example, the participant's unmodified order may be used to determine if the participant obtains the rights with respect to a given incoming contra order.

According to an embodiment of the invention, the awarding of first-on-the-follow rights and/or the trading system transitioning from the first state to the second state may trigger the modification of the first-on-the-follow participant's order, either by automatically modifying the order or prompting the participant to have the order modified, as discussed above. According to another embodiment of the invention, the input of any incoming contra order in the second state may trigger modification of the first-on-the-follow participant's order. According to another embodiment of the invention, the input of an incoming contra order in the second state to which the first-on-the-follow participant has first-on-the-follow rights may trigger modification of the first on the follow participant's order. According to a further embodiment of the invention, the trading on an incoming contra order in the second state may trigger the modification of the first-on-the-follow participant's order. One skilled in the art will recognize that other events may be used to trigger the modification of a first-on-the-follow participant's order.

According to another embodiment of the invention, rather than the first-on-the-follow participant's order being modified as discussed above, the order may be removed without affecting the participant's first-on-the-follow rights to trade on an incoming contra order. Such a feature may give the appearance to a participant inputting a contra order that orders are "falling away" in the market. The trading system may be configured to remove a first-on-the-follow order as similarly described above. According to a preferred embodiment of the invention, the initial input of a contra order to which the first-on-the-follow participant has first-on-the-follow rights may trigger the removing of the first-on-the-follow order. Nonetheless, any of the above described triggering events, or others, may cause the order to be removed. According to an embodiment of the invention, with respect to first-on-the-follow rights that only ascribe to a participant once a contra order is input into the trading system as described with reference to FIGS. 5 and 6, for example, the participant's original order may be used to determine if the participant obtains the first-on-the-follow rights with respect to a given incoming contra order.

According to another embodiment of the invention, a trading system may be configured such the first-on-the-follow participant's order is automatically modified (such as upon input of/trading on the contra order) only when the contra order meets certain predetermined criteria, such as price and/or size criteria, as similarly described above. These price and/or size criteria may be default configured by the system and/or stipulated by the participant.

According to another embodiment of the invention as shown in FIG. 11, for a participant that has obtained exclusive first-on-the-follow rights with respect to an incoming contra order (including, if necessary, an order that meets required criteria as discussed above with respect to FIGS. 7-9), a trading system may be configured such that the system automatically causes the first-on-the-follow participant to trade on the incoming contra order when a second participant indicates a willingness to trade on the contra order. According to an embodiment of the invention, the contra order may not be clear to the second participant. According to an embodiment of the invention, the trading system may be default configured to automatically cause a first-on-the-follow participant to trade on an incoming contra order when a second participant indicates a willingness to trade on the contra order. According to another embodiment of the invention, each participant may enable/disable the trading system to automatically cause the participant, upon obtaining the first-on-the-follow rights, to trade in this manner on an incoming contra order when a second participant indicates a willingness to trade on the contra order. According to another embodiment of the invention, upon a participant obtaining the exclusive first-on-the-follow rights, the trading system may prompt the participant to enable the trading system to automatically cause the participant to trade on an incoming contra order when another participant shows a willingness to trade on the contra order.

According to another embodiment of the invention, for a participant that has obtained exclusive first-on-the-follow rights with respect to an incoming contra order, rather than a trading system automatically causing the participant to automatically trade on the incoming contra order when a second participant indicates a willingness to trade on the contra order, the system may only trade on the contra order, in these circumstances, if the contra order meets certain predetermined criteria, such as price and/or size criteria, as similarly described above. These price and/or size criteria may be default configured by the system and/or stipulated by the participant.

According to another embodiment of the invention, a trading system may be configured such that for a first-on-the-follow participant that has an order removed as described above, or has no first-on-the-follow order as described above, the system may automatically cause the first-on-the-follow participant to trade on an incoming contra order to which the participant has obtained exclusive first-on-the-follow rights when another participant indicates a willingness to trade on the contra order even though the first-on-the-follow participant has no order.

Thus, systems and method for defining criteria for obtaining exclusive priority in electronic trading systems have been provided. It will be understood that the foregoing is only illustrative of the principles of the invention, and that various modifications can be made by those skilled in the art without departing from the scope and spirit of the invention.

What is claimed is:

1. A method, comprising:
   transitioning, by at least one processor of at least one computing device, an electronic trading system from a first trading state to a second trading state;
   determining, by the at least one processor, from among a plurality of bids that are pending at a completion of the first trading state, a best bid,
     wherein the best bid comprises a bid having a best price from among the plurality of bids, and
     wherein the best bid is associated with a participant;
   determining, by the at least one processor, that the participant associated with the best bid purchased at least a minimum size in the first trading state;
   based at least in part on (i) determining the best bid and (ii) determining that the participant associated with the best bid purchased at least the minimum size in the first trading state, awarding, by the at least one processor, the participant with a potential right to trade exclusively against at least one offer received in the second trading state;

receiving, by the at least one processor, an offer in the second trading state;

based at least in part on awarding the participant with the potential right to trade exclusively, determining, by the at least one processor, that the participant has a right to trade exclusively against the offer;

based at least in part on determining that the participant has the fight to trade exclusively against the offer, presenting, by the at least one processor, the offer exclusively to the participant;

determining, by the at least one processor, that a different participant indicates a willingness to trade against the offer; and based at least in part on (i) determining that the participant has the right to trade exclusively against the offer and (ii) determining that the different participant indicates the willingness to trade against the offer, automatically causing, by the at least one processor, the participant to trade against the offer.

2. The method of claim 1, wherein determining that the different participant indicates the willingness to trade against the offer comprises:

determining, by the at least one processor, that the different participant has a bid among the plurality of bids that are pending at a completion of the first trading state.

3. The method of claim 1, further comprising:

determining, by the at least one processor, that a size of the best bid satisfies a further minimum size;

and wherein awarding the participant with the potential right to trade exclusively comprises:

awarding, by the at least one processor, the participant with the potential right to trade exclusively based at least in part on determining that the size of the best bid satisfies the further minimum size.

4. The method of claim 1, further comprising: determining, by the at least one processor, that a size of the best bid exceeds a predetermined percentage of a size of the offer;

and wherein determining that the participant has the right to trade exclusively against the offer comprises:

determining, by the at least one processor, that the participant has the right to trade exclusively against the offer based at least in part on determining that the size of the best bid exceeds the predetermined percentage of the size of the offer.

5. The method of claim 1, further comprising:

determining, by the at least one processor, that a difference between a price of the best bid and a price of the offer is within a predetermined delta;

and wherein determining that the participant has the right to trade exclusively against the offer comprises:

determining, by the at least one processor, that the participant has the right to trade exclusively against the offer based at least in part on determining that the difference between the price of the best bid and the price of the offer is within the predetermined delta.

6. The method of claim 1, further comprising:

determining, by the at least one processor, that a size of the offer satisfies a further minimum size;

and wherein determining that the participant has the fight to trade exclusively against the offer comprises:

determining, by the at least one processor, that the participant has the right to trade exclusively against the offer based at least in part on determining that the size of the offer satisfies the further minimum size.

7. The method of claim 1, further comprising:

determining, by the at least one processor, that a price of the best bid satisfies a price criterion with respect to a price of a trade made in the first state;

and wherein awarding the participant with the potential right to trade exclusively further comprises:

awarding, by the at least one processor, the participant with the potential right to trade exclusively based at least in part on determining that the price of the best bid satisfies the price criterion with respect to the price of the trade made in the first state.

8. The method of claim 7, wherein the price criterion comprises the price of the best bid being within a predetermined delta of the price of the trade made in the first state.

9. The method of claim 1, further comprising:

determining, by the at least one processor, that a size of the offer exceeds a predetermined percentage of a size of the best bid;

and wherein determining that the participant has the fight to trade exclusively against the offer comprises:

determining, by the at least one processor, that the participant has the right to trade exclusively against the offer based at least in part on determining that the size of the offer exceeds the predetermined percentage of the size of the best bid.

10. The method of claim 1, further comprising:

based at least in part on awarding the participant with the potential fight to trade exclusively, modifying, by the at least one processor, the best bid, wherein modifying the best bid does not affect the potential right to trade exclusively of the participant.

11. The method of claim 10, wherein modifying the best bid comprises at least one of:

reducing, by the at least one processor, a size of the best bid, and decreasing, by the at least one processor, a price of the best bid.

12. The method of claim 10, wherein modifying the best bid comprises:

removing, by the at least one processor, the best bid.

13. The method of claim 1, wherein presenting the offer exclusively to the participant comprises at least one of:

causing, by the at least one processor, the offer to be shown only to the participant; and making, by the at least one processor, the offer available to be traded against only by the participant.

14. The method of claim 1, further comprising:

determining that the offer has at least one of a best price and a time priority from among a plurality of offers pending in the second trading state;

and wherein determining that the participant has the fight to trade exclusively against the offer comprises:

determining, by the at least one processor, that the participant has the right to trade exclusively against the offer based at least in part on determining that the offer has at least one of the best price and the time priority from among the plurality of offers pending in the second trading state.

15. The method of claim 1, further comprising:
determining, by the at least one processor, from among a plurality of offers that are pending at the completion of the first trading state, a best offer,
wherein the best offer comprises an offer having a best price from among the plurality of offers, and
wherein the best offer is associated with another participant;
determining, by the at least one processor, that the another participant associated with the best offer sold at least a second minimum size in the first trading state; and
based at least in part on (i) determining the best offer and (ii) determining that the another participant associated with the best offer sold at least the second minimum size in the first trading state, awarding, by the at least one processor, the another participant with a potential right to trade exclusively against at least one bid received in the second trading state.

16. The method of claim 15, further comprising:
based at least in part on awarding the another participant with the potential right to trade exclusively against the at least one bid received in the second trading state, modifying, by the at least one processor, the best offer,
wherein modifying the best offer does not affect the potential right to trade exclusively of the another participant, and
wherein modifying the best offer comprises at least one of:
reducing, by the at least one processor, a size of the best offer, and
increasing, by the at least one processor, a price of the best offer, and
removing, by the at least one processor, the best offer.

17. The method of claim 1, further comprising:
based at least in part on determining that the participant has the right to trade exclusively against the offer, modifying, by the at least one processor, the best bid.

18. The method of claim 17, wherein modifying the best bid comprises at least one of:
reducing, by the at least one processor, a size of the best bid, and
decreasing, by the at least one processor, a price of the best bid.

19. The method of claim 17, wherein modifying the best bid comprises:
removing, by the at least one processor, the best bid.

20. The method of claim 1, wherein the second minimum size is equal to the minimum size.

21. An apparatus: comprising:
at least one processor; and
at least one memory device electronically coupled to the at least one processor, wherein the at least one memory device stores instructions which, when executed by the at least one processor, direct the at least one processor to:
transition an electronic trading system from a first trading state to a second trading state,
determine, from among a plurality of bids that are pending at a completion of the first trading state, a best bid,
wherein the best bid comprises a bid having a best price from among the plurality of bids having a best price, and
wherein the best bid is associated with a participant;
determine that the participant associated with the best bid purchased at least a minimum size in the first trading state;
based at least in part on (i) determining the best bid and (ii) determining that the participant associated with the best bid purchased at least the minimum size in the first trading state, award the participant with a potential right to trade exclusively against at least one offer received in the second trading state;
receive an offer in the second trading state,
based at least in part on awarding the participant with the potential right to trade exclusively, determine that the participant has a fight to trade exclusively against the offer;
based at least in part on determining that the participant has the fight to trade exclusively against the offer, present the offer exclusively to the participant;
determine that a different participant indicates a willingness to trade against the offer; and
based at least in part on (i) determining that the participant has the right to trade exclusively against the offer and (ii) determining that the different participant indicates the willingness to trade against the offer, automatically causing the participant to trade against the offer.

22. The apparatus of claim 21, wherein presenting the offer exclusively to the participant comprises at least one of:
causing the offer to be shown only to the participant; and
making the offer available to be traded against only by the participant.

23. The apparatus of claim 21, wherein the instructions, when executed by the at least one processor, further direct the at least one processor to:
determine that the offer has at least one of a best price and a time priority from among a plurality of offers pending in the second trading state;
and
wherein determining that the participant has the fight to trade exclusively against the offer comprises:
determining that the participant has the right to trade exclusively against the offer based at least in part on determining that the offer has at least one of the best price and the time priority from among the plurality of offers pending in the second trading state.

24. The apparatus of claim 21, wherein the instructions, when executed by the at least one processor, further direct the at least one processor to:
determine, from among a plurality of offers that are pending at the completion of the first trading state, a best offer,
wherein the best offer comprises an offer having a best price from among the plurality of offers, and
wherein the best offer is associated with another participant;
determine that the another participant associated with the best offer sold at least a second minimum size in the first trading state; and
based at least in part on (i) determining the best offer and (ii) determining that the another participant associated with the best offer sold at least the second minimum size in the first trading state, award the another participant with a potential right to trade exclusively against at least one bid received in the second trading state.

25. The apparatus of claim 24, wherein the instructions, when executed by the at least one processor, further direct the at least one processor to:
based at least in part on awarding the another participant with the potential right to trade exclusively against the at least one bid received in the second trading state, modify the best offer,
wherein modifying the best offer does not affect the potential right to trade exclusively of the another participant, and wherein modifying the best offer comprises at least one of:
  reducing a size of the best offer, and
  increasing a price of the best offer, and
  removing the best offer.

26. The apparatus of claim 21, wherein wherein determining that the different participant indicates the willingness to trade against the offer comprises:
  determining, by the at least one processor, that the different participant has a bid among the plurality of bids that are pending at a completion of the first trading state.

27. The apparatus of claim 21, wherein the instructions, when executed by the at least one processor, further direct the at least one processor to:
  determine that a size of the best bid satisfies a further minimum size,
and
wherein awarding the participant with the potential right to trade exclusively comprises:
  awarding the participant with the potential right to trade exclusively based at least in part on determining that the size of the best bid satisfies the further minimum size.

28. The apparatus of claim 21, wherein the instructions, when executed by the at least one processor, further direct the at least one processor to:
  determine that a size of the best bid exceeds a predetermined percentage of a size of the offer;
and
wherein determining that the participant has the fight to trade exclusively against the offer comprises:
  determining that the participant has the right to trade exclusively against the offer based at least in part on determining that the size of the best bid exceeds the predetermined percentage of the size of the offer.

29. The apparatus of claim 21, wherein the instructions, when executed by the at least one processor, further direct the at least one processor to:
  determine that a difference between a price of the best bid and a price of the offer is within a predetermined delta;
and
wherein determining that the participant has the fight to trade exclusively against the offer comprises:
  determining that the participant has the right to trade exclusively against the offer based at least in part on determining that the difference between the price of the best bid and the price of the offer is within the predetermined delta.

30. The apparatus of claim 21, wherein the instructions, when executed by the at least one processor, further direct the at least one processor to:
  determine that a size of the offer satisfies a further minimum size;
and
wherein determining that the participant has the right to trade exclusively against the offer comprises:
  determining that the participant has the right to trade exclusively against the offer based at least in part on determining that the size of the offer satisfies the further minimum size.

31. The apparatus of claim 21, wherein the instructions, when executed by the at least one processor, further direct the at least one processor to:
  determine that a size of the offer exceeds a predetermined percentage of a size of the best bid;
and
wherein determining that the participant has the right to trade exclusively against the offer comprises:
  determining that the participant has the right to trade exclusively against the offer based at least in part on determining that the size of the offer exceeds the predetermined percentage of the size of the best bid.

32. The apparatus of claim 21, wherein the instructions, when executed by the at least one processor, further direct the at least one processor to:
  determine that a price of the best bid is within a predetermined delta of a price of a trade made in the first state;
and
wherein awarding the participant with the potential right to trade exclusively further comprises:
  awarding the participant with the potential right to trade exclusively based at least in part on determining that the price of the best bid is within the predetermined delta of the price of the trade made in the first state.

33. The apparatus of claim 21, wherein the instructions, when executed by the at least one processor, further direct the at least one processor to:
  based at least in part on determining that the participant has the right to trade exclusively against the offer, modify the best bid.

34. The apparatus of claim 33, wherein modifying the best bid comprises at least one of:
  reducing a size of the best bid, and
  decreasing a price of the best bid.

35. The apparatus of claim 33, wherein modifying the best bid comprises:
  removing the best bid.

36. The apparatus of claim 21, wherein the instructions, when executed by the at least one processor, further direct the at least one processor to:
  based at least in part on awarding the participant with the potential right to trade exclusively, modify the best bid, wherein modifying the best bid does not affect the potential right to trade exclusively of the participant.

37. The apparatus of claim 36, wherein modifying the best bid comprises at least one of:
  reducing a size of the best bid, and
  decreasing a price of the best bid.

38. The apparatus of claim 36, wherein modifying the best bid comprises:
  removing the best bid.

39. The apparatus of claim 21, wherein the second minimum size is equal to the minimum size.

40. A computer readable medium comprising a program that, when executed by at least one computing device, directs the at least one computing device to:
  transition an electronic trading system from a first trading state to a second trading state,
  determine, from among a plurality of bids that are pending at a completion of the first trading state, a best bid,
    wherein the best bid comprises a bid having a best price from among the plurality of bids, and
    wherein the best bid is associated with a participant;
  determine that the participant associated with the best bid purchased at least a minimum size in the first trading state;
  based at least in part on (i) determining the best bid and (ii) determining that the participant associated with the best bid purchased at least the minimum size in the first trading state, award the participant with a potential fight to trade exclusively against at least one offer received in the second trading state;
  receive an offer in the second trading state, based at least in part on awarding the participant with the potential fight to trade exclusively, determine that the participant has a right to trade exclusively against the offer;

based at least in part on determining that the participant has the fight to trade exclusively against the offer, present the offer exclusively to the participant;

determine that a different participant indicates a willingness to trade against the offer; and based at least in part on (i) determining that the participant has the right to trade exclusively against the offer and (ii) determining that the different participant indicates the willingness to trade against the offer, automatically causing the participant to trade against the offer.

41. The computer readable medium of claim 40, wherein determining that the different participant indicates the willingness to trade against the offer comprises:

determining that the different participant has a bid among the plurality of bids that are pending at a completion of the first trading state.

42. The computer readable medium of claim 40, wherein the instructions, when executed by the at least one computing device, further direct the at least one computing device to:

determine that the offer has at least one of a best price and a time priority from among a plurality of offers pending in the second trading state;

and wherein determining that the participant has the fight to trade exclusively against the offer comprises:

determining that the participant has the right to trade exclusively against the offer based at least in part on determining that the offer has at least one of the best price and the time priority from among the plurality of offers pending in the bid/offer second trading state.

43. The computer readable medium of claim 40, wherein the instructions, when executed by the at least one computing device, further direct the at least one computing device to:

determine, from among a plurality of offers that are pending at the completion of the first trading state, a best offer, wherein the best offer comprises an offer having a best price from among the plurality of offers, and wherein the best offer is associated with another participant;

determine that the another participant associated with the best offer sold at least a second minimum size in the first trading state; and based at least in part on (i) determining the best offer and (ii) determining that the another participant associated with the best offer sold at least the second minimum size in the first trading state, award the another participant with a potential right to trade exclusively against at least one bid received in the second trading state.

44. The computer readable medium of claim 43, wherein the instructions, when executed by the at least one computing device, further direct the at least one computing device to:

based at least in part on awarding the another participant with the potential right to trade exclusively against the at least one bid received in the second trading state, modify the best offer, wherein modifying the best offer does not affect the potential right to trade exclusively of the another participant, and wherein modifying the best offer comprises at least one of:

reducing a size of the best offer, and
increasing a price of the best offer, and
removing the best offer.

45. The computer readable medium of claim 40, wherein the instructions, when executed by the at least one computing device, further direct the at least one computing device to:

determine that a size of the best bid satisfies a further minimum size;

and wherein awarding the participant with the potential right to trade exclusively comprises:

awarding the participant with the potential right to trade exclusively based at least in part on determining that the size of the best bid satisfies the further minimum size.

46. The computer readable medium of claim 40, wherein the instructions, when executed by the at least one computing device, further direct the at least one computing device to:

determine that a size of the best bid exceeds a predetermined percentage of a size of the offer;

and wherein determining that the participant has the fight to trade exclusively against the offer comprises:

determining that the participant has the right to trade exclusively against the offer based at least in part on determining that the size of the best bid exceeds the predetermined percentage of the size of the offer.

47. The computer readable medium of claim 40, wherein the instructions, when executed by the at least one computing device, further direct the at least one computing device to:

determine that a difference between a price of the best bid and a price of the offer is within a predetermined delta;

and wherein determining that the participant has the fight to trade exclusively against the offer comprises:

determining that the participant has the right to trade exclusively against the offer based at least in part on determining that the difference between the price of the best bid and the price of the offer is within the predetermined delta.

48. The computer readable medium of claim 40, wherein the instructions, when executed by the at least one computing device, further direct the at least one computing device to:

determine that a size of the offer satisfies a further minimum size;

and wherein determining that the participant has the right to trade exclusively against the offer comprises:

determining that the participant has the right to trade exclusively against the offer based at least in part on determining that the size of the offer satisfies the further minimum size.

49. The computer readable medium of claim 40, wherein the instructions, when executed by the at least one computing device, further direct the at least one computing device to:

determine that a size of the offer exceeds a predetermined percentage of a size of the best bid;

and wherein determining that the participant has the right to trade exclusively against the offer comprises:

determining that the participant has the right to trade exclusively against the offer based at least in part on determining that the size of the offer exceeds the predetermined percentage of the size of the best bid.

50. The computer readable medium of claim 40, wherein the instructions, when executed by the at least one computing device, further direct the at least one computing device to:

determine that a price of the best bid is within a predetermined delta of a price of a trade made in the first state;

and wherein awarding the participant with the potential right to trade exclusively further comprises:
  awarding the participant with the potential right to trade exclusively based at least in part on determining that the price of the best bid is within the predetermined delta of the price of the trade made in the first state.

51. The computer readable medium of claim 40, wherein the instructions, when executed by the at least one computing device, further direct the at least one computing device to:
  based at least in part on determining that the participant has the right to trade exclusively against the offer, modify the best bid.

52. The computer readable medium of claim 51, wherein modifying the best bid comprises at least one of:
  reducing a size of the best bid, and
  decreasing a price of the best bid.

53. The computer readable medium of claim 51, wherein modifying the best bid comprises:
  removing the best bid.

54. The computer readable medium of claim 40, wherein the instructions, when executed by the at least one computing device, further direct the at least one computing device to:
  based at least in part on awarding the participant with the potential right to trade exclusively, modify the best bid, wherein modifying the best bid does not affect the potential right to trade exclusively of the participant.

55. The computer readable medium of claim 54, wherein modify modifying the best bid comprises at least one of:
  reducing a size of the best bid, and
  decreasing a price of the best bid.

56. The computer readable medium of claim 54, wherein modifying the best bid comprises:
  removing the best bid.

57. The computer readable medium of claim 40, wherein the second minimum size is equal to the minimum size.

* * * * *